(12) United States Patent
Bowles et al.

(10) Patent No.: US 12,187,234 B2
(45) Date of Patent: Jan. 7, 2025

(54) LATCH ASSEMBLY FOR PIVOTING HITCH DEVICE

(71) Applicant: KUAT INNOVATIONS LLC, Springfield, MO (US)

(72) Inventors: Jordan Bowles, Springfield, MO (US); Austin Harrill, Springfield, MO (US); Luke Kuschmeader, Springfield, MO (US)

( * ) Notice: Subject to any disclaimer, the term of this patent is extended or adjusted under 35 U.S.C. 154(b) by 1400 days.

(21) Appl. No.: 16/596,197

(22) Filed: Oct. 8, 2019

(65) Prior Publication Data

US 2021/0101428 A1 Apr. 8, 2021

(51) Int. Cl.
*B60R 9/06* (2006.01)
*B60R 9/10* (2006.01)
*B60D 1/52* (2006.01)

(52) U.S. Cl.
CPC .............. *B60R 9/06* (2013.01); *B60R 9/10* (2013.01); *B60D 1/52* (2013.01)

(58) Field of Classification Search
CPC .... B60R 9/06; B60R 9/10; B60R 1/40; B60D 1/1675; B60D 1/04; B60D 1/52; B60D 1/42
USPC .............................. 224/495, 502; 280/491.2
See application file for complete search history.

(56) References Cited

U.S. PATENT DOCUMENTS

| | | |
|---|---|---|
| 3,326,434 A | 6/1967 | Cheadle |
| 3,753,520 A | 8/1973 | Bodde |
| 3,804,308 A | 4/1974 | Bodde |
| 4,002,364 A | 1/1977 | Eshelman |
| 4,088,253 A | 5/1978 | Saffold |
| 4,400,129 A * | 8/1983 | Eisenberg ................ B60R 9/06 224/532 |
| 4,434,922 A | 3/1984 | Brandsen et al. |
| 4,561,575 A | 12/1985 | Jones |
| 4,863,080 A | 9/1989 | Graber |
| 4,875,608 A | 10/1989 | Graber |
| 4,946,084 A | 8/1990 | Britto |
| 4,948,021 A | 8/1990 | Myrphy et al. |
| 5,004,133 A | 4/1991 | Wyers |
| 5,094,373 A | 3/1992 | Lovci |
| 5,518,159 A * | 5/1996 | DeGuevara ............... B60R 9/06 224/512 |

(Continued)

FOREIGN PATENT DOCUMENTS

WO  WO-2007092336 A2 *  8/2007  ............. B60R 9/065

*Primary Examiner* — Nathan J Newhouse
*Assistant Examiner* — Lester L Vanterpool
(74) *Attorney, Agent, or Firm* — James H. Jeffries; Kutak Rock LLP

(57) ABSTRACT

A latch assembly is described for use with a pivoting hitch device that allows the pivoting of a bicycle rack away from the rear of a vehicle to allow access to a lift gate, tail gate, trunk, hatchback, or other rear access point for a vehicle. The pivoting hitch device has two support members that are pivotally attached to one another. The latch assembly is attached to one of the support members of the pivoting hitch device, and may have an actuator, a latch bar, and a connecting member that connects the actuator to the latch bar. A latch member is attached to the other support member of the pivoting hitch device. The latch bar engages the latch member to secure the two support members in relation to one another and prevent pivotal movement.

6 Claims, 24 Drawing Sheets

(56) References Cited

U.S. PATENT DOCUMENTS

| | | | |
|---|---|---|---|
| 5,544,799 A * | 8/1996 | Didlake | B60R 9/06 224/523 |
| 5,647,521 A * | 7/1997 | Burgess | B60R 9/10 224/532 |
| 5,664,717 A * | 9/1997 | Joder | B60R 9/06 224/532 |
| 5,685,469 A * | 11/1997 | Stapleton | B60R 9/10 224/536 |
| 5,806,737 A * | 9/1998 | Clark | B60R 9/06 224/527 |
| 6,123,498 A * | 9/2000 | Surkin | B60R 9/06 224/924 |
| 6,199,735 B1 * | 3/2001 | Cothern | B60R 9/10 224/509 |
| 6,237,823 B1 * | 5/2001 | Stewart | B60R 9/065 224/523 |
| 6,332,626 B1 | 12/2001 | Morrill | |
| 6,364,337 B1 | 4/2002 | Rowland et al. | |
| 6,386,410 B1 * | 5/2002 | Van Dusen | B60R 9/06 224/535 |
| 6,401,999 B1 * | 6/2002 | Hehr | B60R 9/06 224/508 |
| 6,460,870 B2 | 10/2002 | Moss | |
| 6,467,664 B2 | 10/2002 | Robins et al. | |
| 6,701,913 B1 * | 3/2004 | LeDuc | B60R 9/06 126/30 |
| 6,722,380 B1 | 4/2004 | Hafer | |
| 6,745,926 B2 | 6/2004 | Chimenti | |
| 6,840,418 B2 | 1/2005 | Robins et al. | |
| 6,957,826 B1 | 10/2005 | Mackarvich | |
| 7,261,229 B1 * | 8/2007 | Allen | B60R 9/10 224/495 |
| 7,425,014 B1 | 9/2008 | Palmer | |
| 7,631,791 B1 * | 12/2009 | Allen | B60R 9/10 224/531 |
| 7,819,128 B2 | 10/2010 | Clark et al. | |
| 7,909,350 B1 | 3/2011 | Andry | |
| 8,210,408 B2 | 7/2012 | Sautter et al. | |
| 8,286,843 B2 * | 10/2012 | Bogoslofski | B60R 9/10 224/532 |
| 8,408,577 B2 | 4/2013 | Works | |
| 8,474,852 B1 | 7/2013 | Granados | |
| 8,485,207 B1 | 7/2013 | Boyington | |
| 8,820,598 B2 | 9/2014 | Tennyson et al. | |
| 9,381,868 B2 * | 7/2016 | Anyan | B60R 9/10 |
| 9,475,353 B2 * | 10/2016 | Mehlen | B60R 9/065 |
| 9,987,998 B2 * | 6/2018 | Shen | B60R 9/06 |
| 10,328,862 B2 * | 6/2019 | Eichmann | B60D 1/42 |
| 10,384,621 B2 * | 8/2019 | Mehlen | B60R 9/10 |
| 10,752,066 B2 * | 8/2020 | Rodriguez | B60D 1/1675 |
| 2002/0020728 A1 | 2/2002 | Chimenti | |
| 2003/0184048 A1 | 10/2003 | Bonde | |
| 2006/0273125 A1 * | 12/2006 | Bogoslofski | B60R 9/06 224/521 |
| 2006/0292915 A1 | 12/2006 | Bogoslofski et al. | |
| 2010/0213687 A1 | 8/2010 | Mcdaniel et al. | |
| 2010/0270774 A1 | 10/2010 | Boberg et al. | |
| 2012/0305612 A1 * | 12/2012 | Bell, Jr. | B60R 9/06 224/519 |
| 2015/0203049 A1 * | 7/2015 | Eichmann | B60R 9/06 224/509 |
| 2016/0129847 A1 * | 5/2016 | Mehlen | B60D 1/58 224/509 |
| 2018/0345744 A1 * | 12/2018 | Rodriguez | B60R 9/06 |

* cited by examiner

LATCH ASSEMBLY FOR PIVOTING HITCH DEVICE

CROSS-REFERENCE TO RELATED APPLICATIONS

None.

BACKGROUND

Field of the Invention

The pivoting rack support device described herein is in the field of devices for attaching equipment racks, such as bicycle racks, scooter racks, cargo carriers, and similar racks to a vehicle. More specifically, this disclosure is in the field of accessories for use with a receiver hitch or similar style attachment point on a vehicle. Furthermore, the pivoting rack support device is in the field of devices that allow an equipment rack to be pivoted away from the vehicle without disconnecting the equipment rack from the vehicle.

Description of the Related Art

Pivoting hitch devices allow an equipment rack to be pivoted away from a vehicle to which the pivoting hitch device is attached. This is desirable to allow a person to access the rear of their vehicle, such as a tailgate, trunk, lift gate, hatchback, or other such access point on the rear of a vehicle, without removing an equipment rack from the vehicle, or the equipment from the equipment rack.

For example, a user may want to access a lift gate of a sport utility vehicle without removing bicycles from a hitch-mounted bicycle rack. In many cases the lift gate would hit the bicycles before it was raised enough to allow access to the interior of the vehicle. In order to move the bicycles out of the way without removing them from the rack, pivoting hitch devices allow the equipment rack itself to be pivoted away from a vehicle, out of the path of the lift gate or other access door. Once the equipment rack is pivoted away from the rear of the vehicle a user can easily access the rear entry point.

For example, FIG. 16 shows an inventive pivoting hitch device attached to a vehicle. No equipment rack is shown attached to the pivoting hitch device in FIG. 16, but in this closed position, an equipment rack would extend rearward from the receiver socket 110. When the arm of the pivoting hitch device has been pivoted to the position shown in FIG. 17, the equipment rack will be disposed to the rear and right side of the vehicle, well away from the rear of the vehicle.

Since the pivoting hitch devices are used to carry expensive, heavy equipment, on vehicles moving at high speeds such as speeds common on the interstate highway system, it is important that the pivoting hitch devices do not inadvertently swing from one position to another during motion of the vehicle. The improved pivoting hitch device described herein has an inventive, automatic latch to make user operation of the pivoting arm easier and less prone to accidental movement during vehicle use.

SUMMARY OF THE INVENTION

In various embodiments, the inventive device is a latch assembly for a pivoting hitch device that has a first support member for attachment to a vehicle at an attachment point with a pivotal attachment to a second support member. In typical embodiments, the second support member moves from a closed position that is substantially parallel to the first support member to an open position not parallel to the first support member. In some of these embodiments, the latch assembly comprises an actuator attached to the second support member and movable from a latched position to an unlatched position, a latch bar attached to the second support member and movable from a latched position to an unlatched position, a latch member attached to the first support member, the latch member with at least one aperture for receiving the latch bar in the latched position, a connecting member having a first end attached to the actuator and a second end attached to the latch bar so that movement of the actuator from the latched position to the unlatched position moves the latch bar from the latched position to the unlatched position, and a biasing mechanism disposed to bias the latch bar toward the latched position.

In some embodiments the latch bar has a lug portion and a spaced apart pivot axis, wherein the latch bar is pivotally attached to the second support member at the pivot axis. Similarly, the in some versions of the latch assembly, the latch member comprises a plate, and the apertures comprise a notch in an edge of the plate for receiving the lug portion of the latch bar in the latched position.

Various embodiments of the biasing mechanism comprise a torsion spring having at least one coil portion, a first lever portion, and a second lever portion, where the coil portion is disposed at the pivot axis of the latch bar, and the first lever portion engages the second support member, and the second lever portion engages the latch bar.

In some versions the actuator is pivotally attached to the second support member by an actuator pivot pin, and a first end of the connecting member is pivotally attached to the actuator by a connecting member pivot pin that is separate from the actuator pivot pin to create substantially linear motion of the connecting rod when the actuator is pivoted. In some versions the second end of the connecting member is pivotally attached to the latch bar between the lug portion and the pivot axis of the latch bar.

In a preferred embodiment the connecting member, the latch bar, and the biasing mechanism are substantially contained within a cavity in the second support member. In some of these embodiments the lug portion of the latch bar extends through an aperture in the second support member to engage an aperture in the latch member. In some of these embodiments, a portion of the lug may be outside the second support member. The actuator may be attached to an outer surface of the second support member, and the connecting member may be attached to the actuator through an elongated aperture in the second support member.

When the latch bar is in the unlatched position the lug portion of the latch bar is not disposed in an aperture in the latch member and the second support member may pivot with respect to the first support member. In some embodiments, when latched the lug portion of the latch bar extends through an aperture in the second support member and is received by an aperture in the latch member. In some embodiments the latch member is a plate and the apertures in the latch member comprise notches in an edge of the plate.

In a preferred embodiment the actuator is attached to the second support member adjacent to the attachment point to the vehicle when the second support member is in the closed position so that it may be easily reached by a user near the attachment point.

In some embodiments the latch bar is adjacent to the pivotal attachment of the second support member to the first support member. In some of these embodiments the latch member is the bottom plate of the pivotal attachment of the second support member to the first support member.

In other embodiments, the invention comprises a pivoting hitch device for a vehicle, the pivoting hitch device having a first support member attached to a vehicle at a vehicle attachment point, and a second support member pivotally attached to the first support member at a pivotal attachment that is spaced apart from the vehicle attachment point, and a latch assembly. In some embodiments, the latch assembly comprises a latch actuator attached to an actuator member selected from the first support member and the second support member, a latch bar attached to the actuator member, where the latch actuator and the latch bar move from a latched position to an unlatched position, a connecting member attached at a first end to the latch actuator and at a second end to the latch bar, where movement of the actuator from the latched position to the unlatched position moves the latch bar from the latched position to the unlatched position, a latch member attached to the other support member other than the actuator member, where the latch member has an aperture for engaging the latch bar in the latched position, and a biasing mechanism attached to the latch bar and biasing the latch bar toward the latched position.

In other embodiments of the inventive pivoting hitch device the latch actuator is pivotally attached to an outside surface of the actuator member; and the connecting member, the latch bar, and the biasing mechanism are substantially disposed inside the other support member. In some of these embodiments, the first end of the connecting member is attached to the latch actuator through an elongated aperture in the actuator member.

In other embodiments, the pivoting hitch device for a vehicle with a receiver hitch comprises a first support member attached to a receiver drawbar, the first support member extending from the receiver drawbar toward a side of the vehicle; a second support member pivotally attached by a hinge to the first support member near the side of the vehicle and extending toward the receiver drawbar, and substantially parallel to the first support member in a closed position. In these embodiments the second support member pivots from the closed position to an open position that is substantially non-parallel to the first support member; a receiver socket attached to the second support member in proximity to the receiver drawbar when the second support member is in the closed position; a latch actuator attached to the second support member in proximity to the receiver socket; a latch bar attached to the second support member in proximity to the hinge; a latch member attached to the first support member in proximity to the hinge, wherein the latch bar engages the latch member in a latched position; and a biasing mechanism that biases the latch bar toward the latched position.

In yet other embodiments, the pivoting hitch device for a vehicle having a hitch attachment device comprises a first support member attached to the hitch attachment device, a second support member pivotally attached to the first support member at a pivotal attachment that is spaced apart from the hitch attachment device; wherein the second support member pivots between a closed position that is substantially parallel to the first support member to an open position that is not parallel to the first support member; a receiver socket attached to the second support member at a point that is adjacent to the vehicle attachment device when the second support member is in the closed position; a latch actuator attached to the second support member adjacent to the receiver socket; a latch mechanism attached to the pivotal attachment to automatically latch the pivotal attachment at least one desired position. In these embodiments, movement of the latch actuator unlatches the latch mechanism.

DETAILED DESCRIPTION

Figure 1:
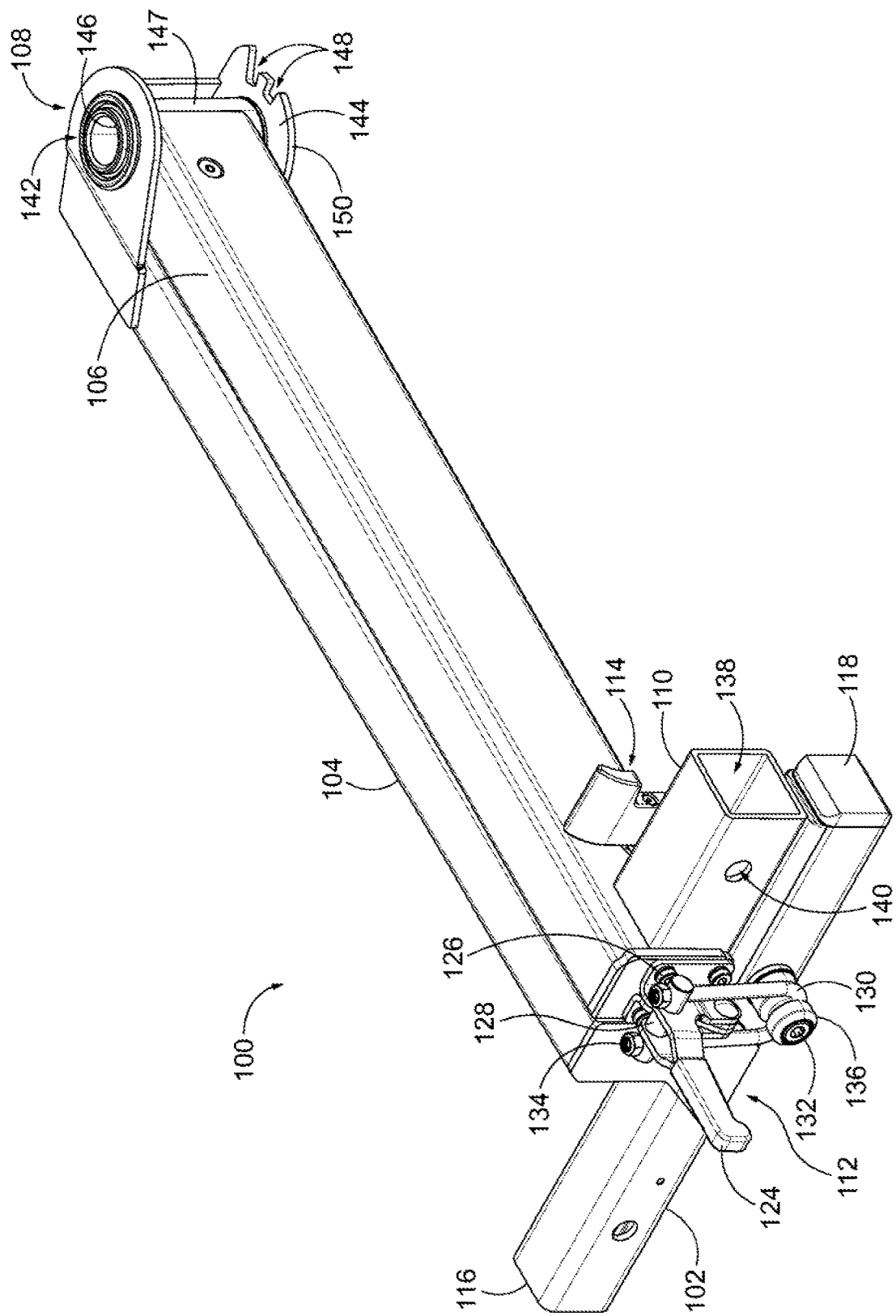
FIG. 1 is a perspective view of an embodiment of the inventive device in a closed configuration.
Figure 2:
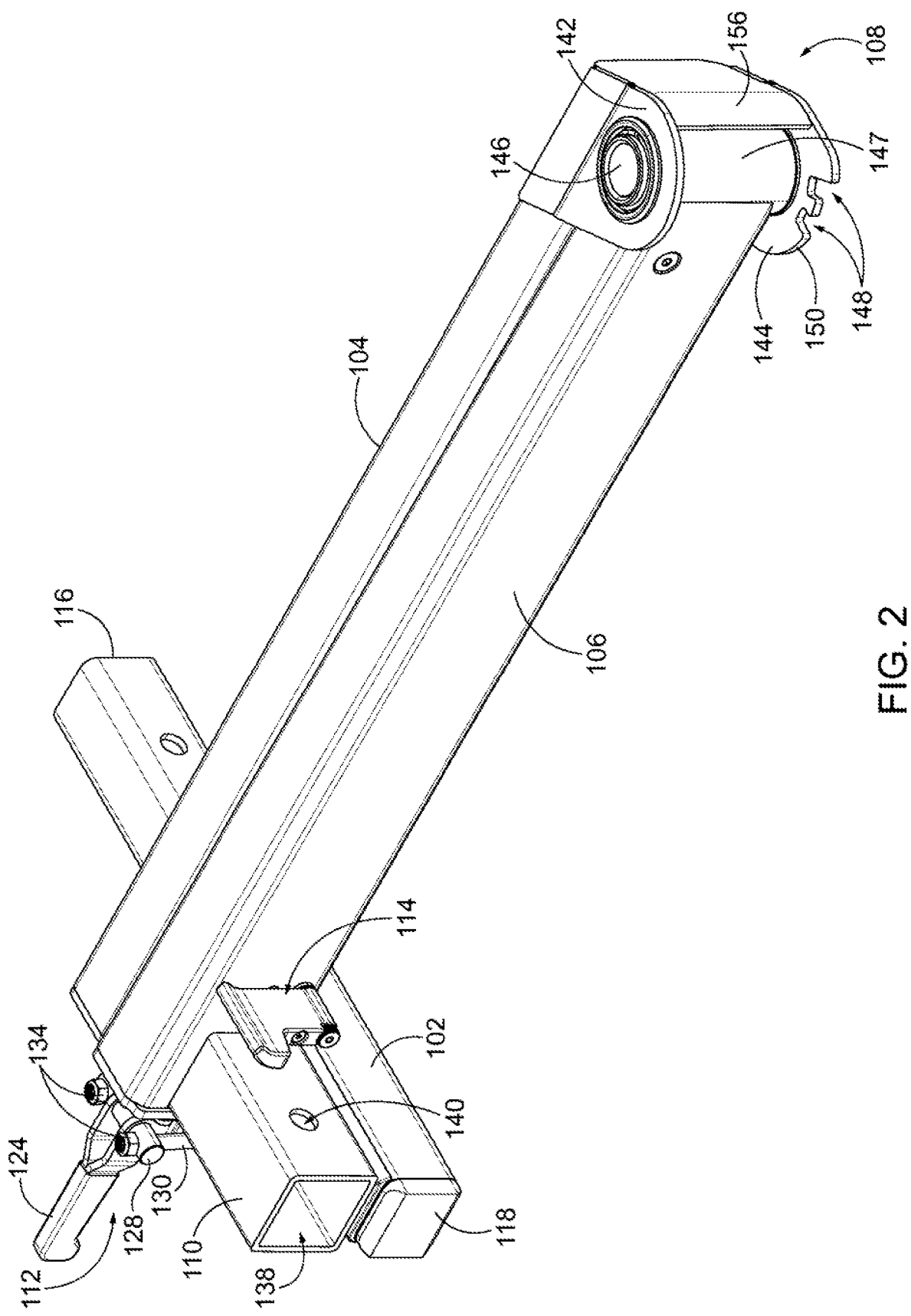
FIG. 2 is a perspective view of an embodiment of the inventive device in a closed configuration.
Figure 3:
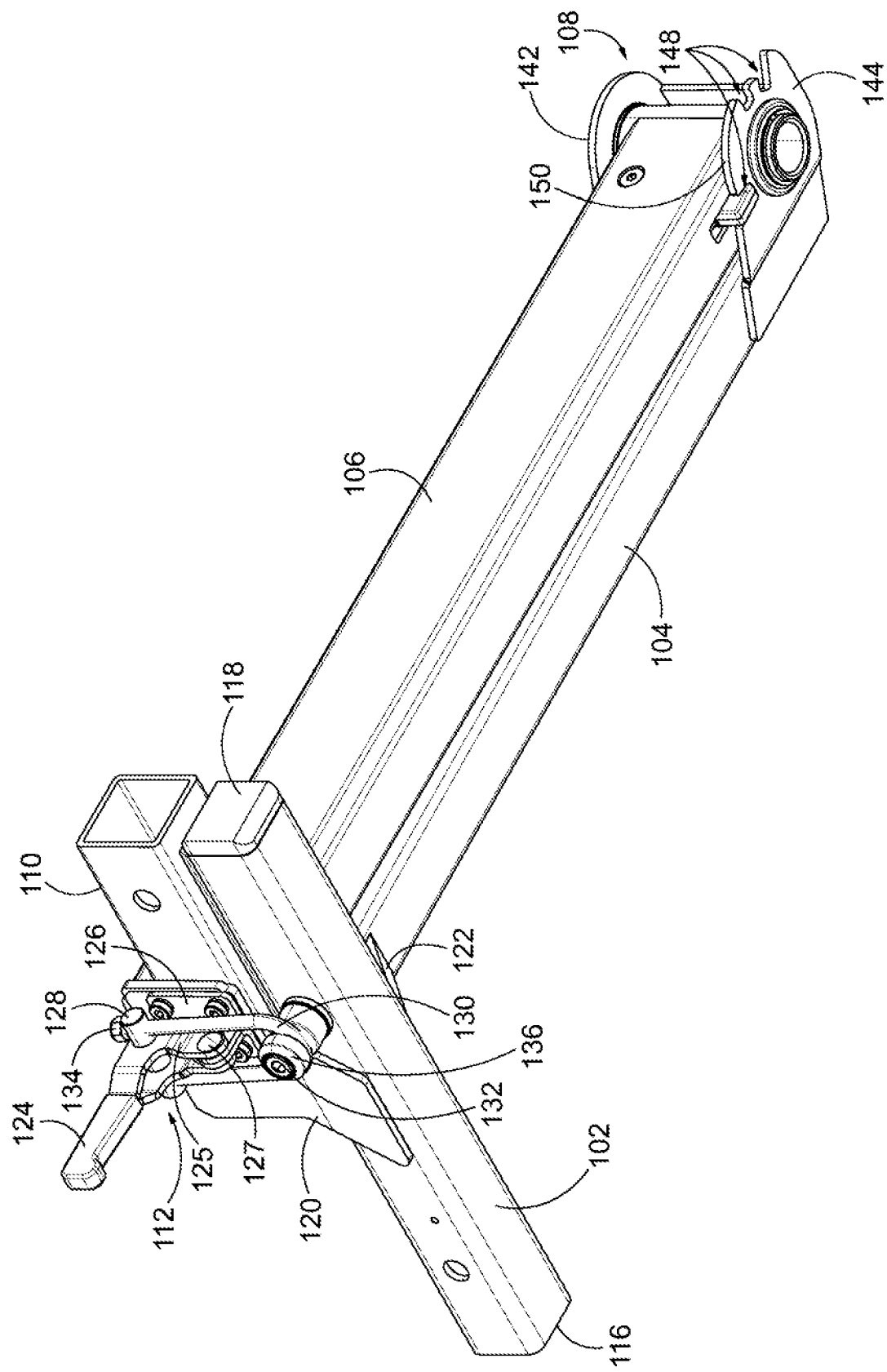
FIG. 3 is a perspective view of an embodiment of the inventive device in a closed configuration.
Figure 4:
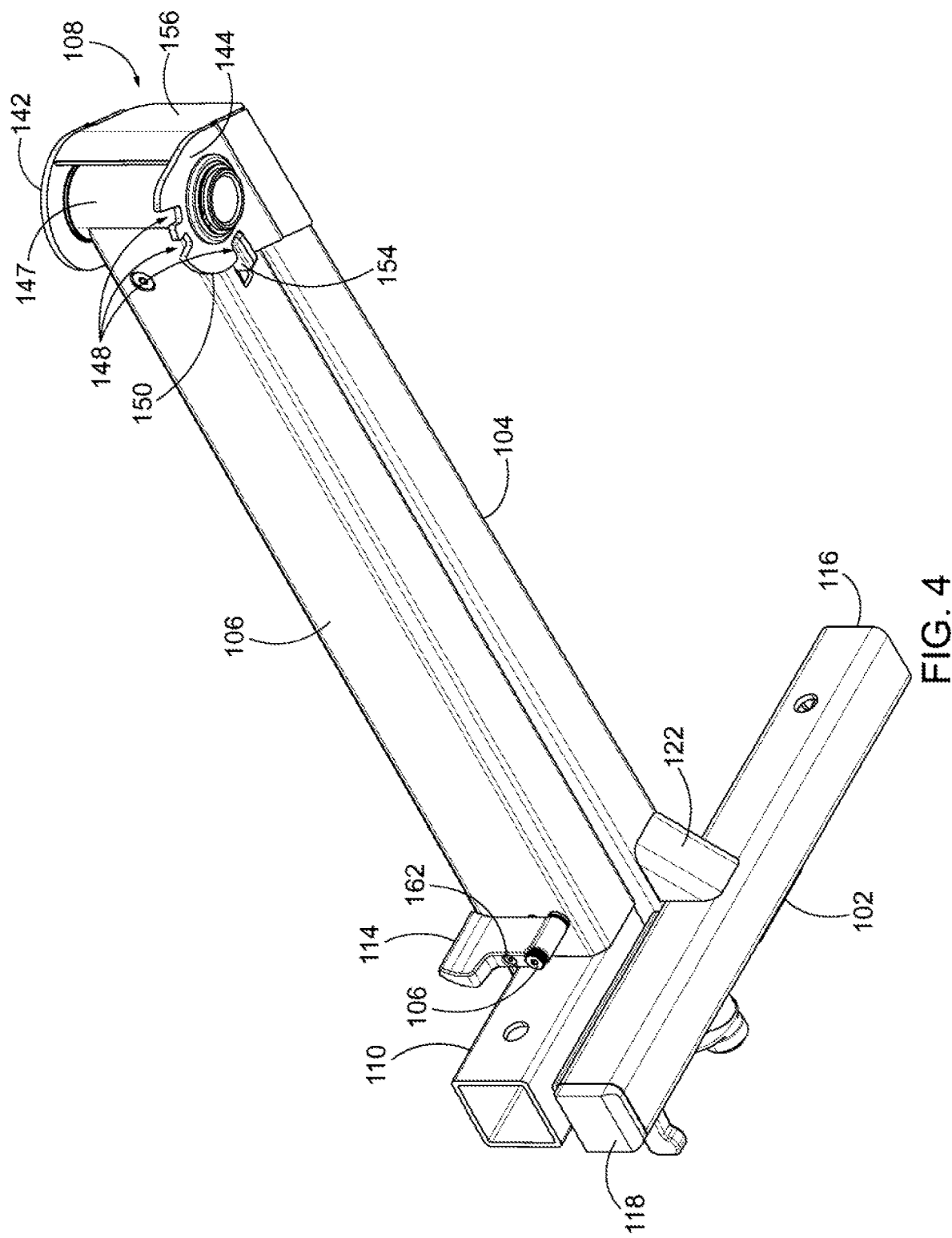
FIG. 4 is a perspective view of an embodiment of the inventive device in a closed configuration.
Figure 5:
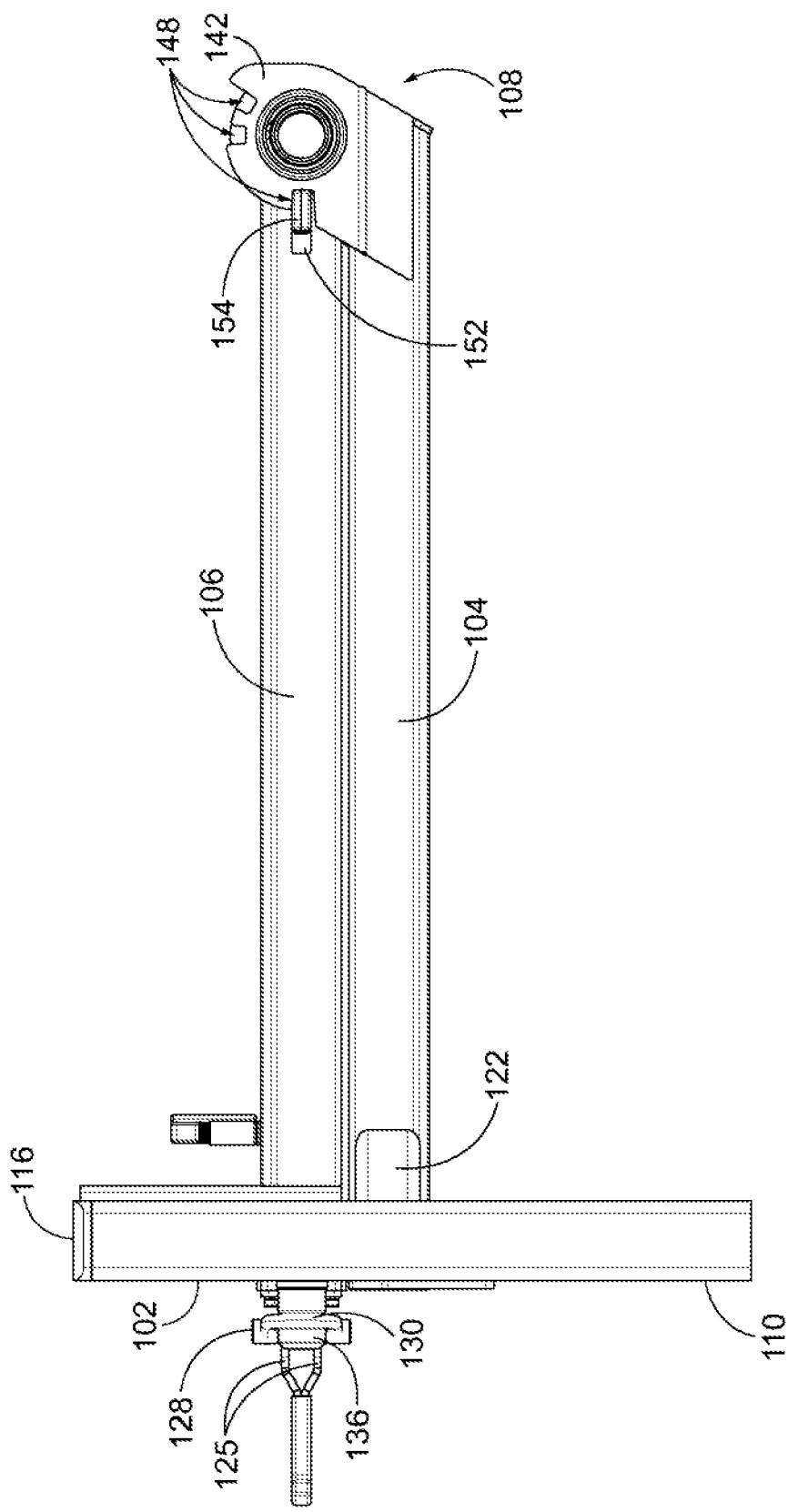
FIG. 5 is a bottom view of an embodiment of the inventive device in a closed configuration.
Figure 6:
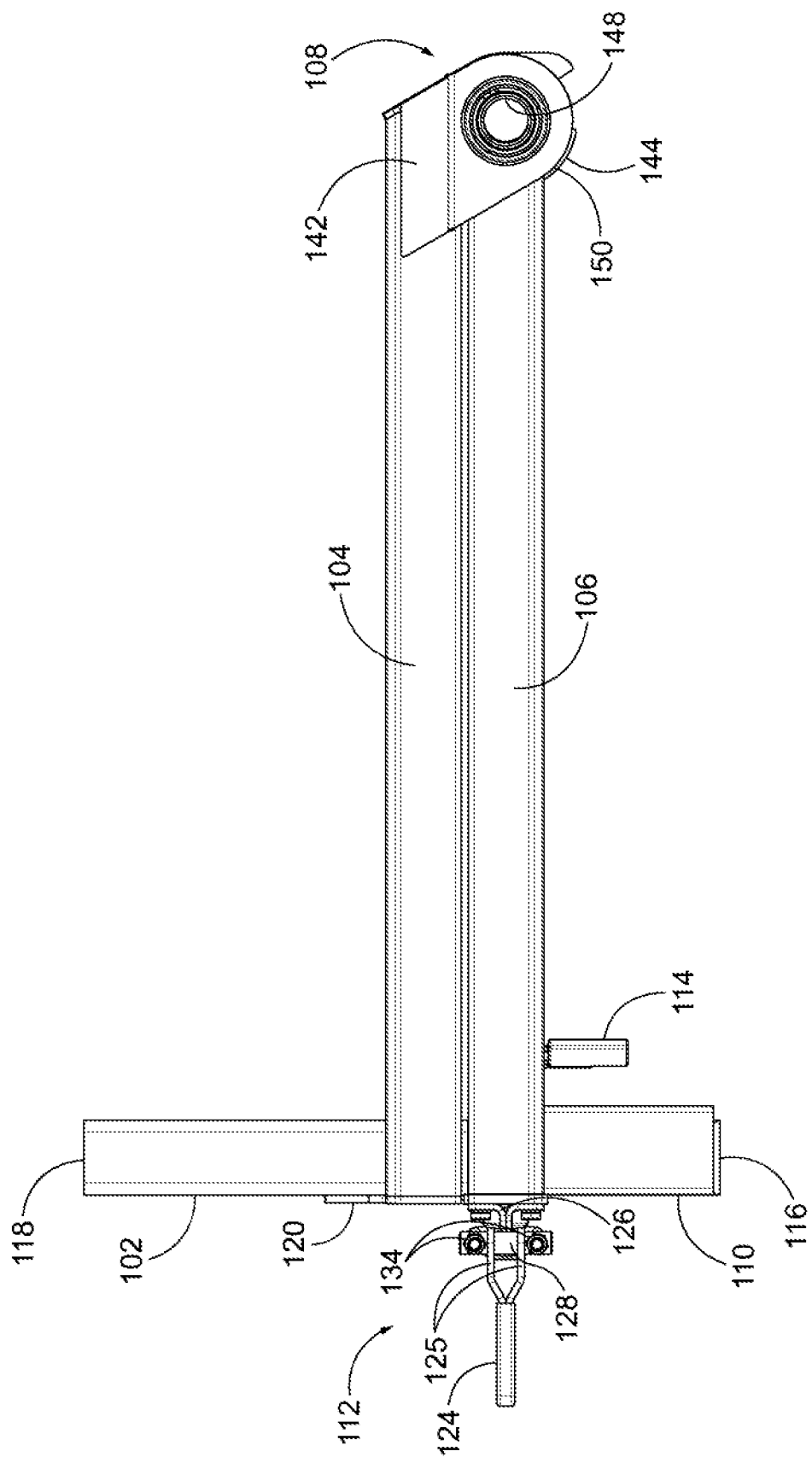
FIG. 6 is a top view of an embodiment of the inventive device in a closed configuration.

Many different types of external equipment racks are used to carry equipment that is too large to fit inside a vehicle, or to allow items to be carried outside the vehicle to save space in the interior. These types of equipment racks commonly include bicycle racks, scooter platforms, and cargo carriers, though other types of equipment, such as lift devices, anvils, or similar types of equipment may also be mounted to a vehicle. Many of these types of equipment racks are attached the rear of a vehicle by means of a receiver socket provided on the rear end of the vehicle. The positioning of the equipment rack near the rear of the vehicle often causes the equipment rack itself, or the equipment loaded on it, to interfere with the operation of a tail gate, lift gate, hatchback, or trunk of the vehicle. Even if the equipment rack or loaded equipment do not interfere with the operation of the vehicle's doors or tailgate, they may prevent a person from accessing those areas once the door or tailgate is open, simply due to the location of the equipment rack.

As a result of the interference of the equipment rack with the use of the vehicle, users may need to remove equipment from the equipment rack, or even remove the equipment rack from the vehicle in order to access the rear entries to the vehicle. This can be a time-consuming, difficult process depending on the type of equipment rack and the equipment stored thereon. It may require tools that are not available, or the ability to lift and pull heavy equipment and the equipment rack. In order to allow a user to access the rear entries on a vehicle to which an equipment rack is attached, pivoting support devices are used to allow an equipment rack to be moved away from the rear of the vehicle to allow access to the vehicle entry points without removing the equipment rack from the vehicle, or the equipment from the equipment rack.

The pivoting hitch device, also referred to as a pivoting rack support device, described herein provides an improved device for pivoting an equipment rack away from the rear of a vehicle to allow easier access to the rear entries of the vehicle. It is provided with automatic latching capabilities so that a user need not touch the mechanism to lock it into a desired position. It also is provided with a quick release mechanism so that a user can quickly unlatch the device to pivot it to an open or closed position. Referring generally to the figures with reference to the following description, various views of an embodiment of the pivoting rack support device 100 are depicted.

The pivoting support device 100 is designed for attachment to a vehicle using the attachment point to which an equipment rack would otherwise be attached, such as a receiver tube of a receiver hitch type attachment point. Current versions of this type of attachment comprise metal tubes with a substantially square cross-section that are attached to the rear of the chassis of a vehicle. The invention described herein is adaptable for use with other versions of a vehicle mounting system or attachment systems that may be developed in the future.

In current receiver hitch systems, the receiver tube, attached to a vehicle, receives a drawbar that supports a ball hitch or similar type attachment for a trailer, or a drawbar attached to an equipment rack may be inserted into the receiver tube and secured therein by various means such as cross-axis bolts or pins. Thus for embodiments of the pivoting rack support device 100 designed for attachment to a receiver tube, the device 100 is provided with or attached to a drawbar 102 for inserting into the receiver tube. In other embodiments of the device 100, the drawbar 102 may be replaced by a different method of attachment for a vehicle, such as attachment to a chassis or other part of the vehicle structure, or some other method or device as may be adopted in the future. The drawbar and other current and future methods of attachment to a vehicle are referred to as a vehicle attachment member.

In the depicted embodiment the vehicle attachment member is a drawbar 102 capable of being inserted into a receiver hitch tube. The first end 116 of the drawbar 102 is inserted into the receiver hitch tube 194 on a vehicle 193, and secured there by bolts, pins, clamps, or other types of attachments. The second end 118 of drawbar 102 extends outwardly away from the vehicle 193 to which the drawbar 102 is attached.

In the depicted embodiment, drawbar 102 provides support to a first support member 104. The first support member 104 may be attached to or formed unitarily with the drawbar 102. The first support member 104 may be welded, bolted, screwed, casted with, or otherwise attached to drawbar 102. In the depicted embodiment a support plate 120 and support brace 122 are attached to the drawbar 102 and first support member 104 to provide additional strength and rigidity to the connection between the components. In other embodiments different arrangements of support plates or braces may be provided.

Figure 16:
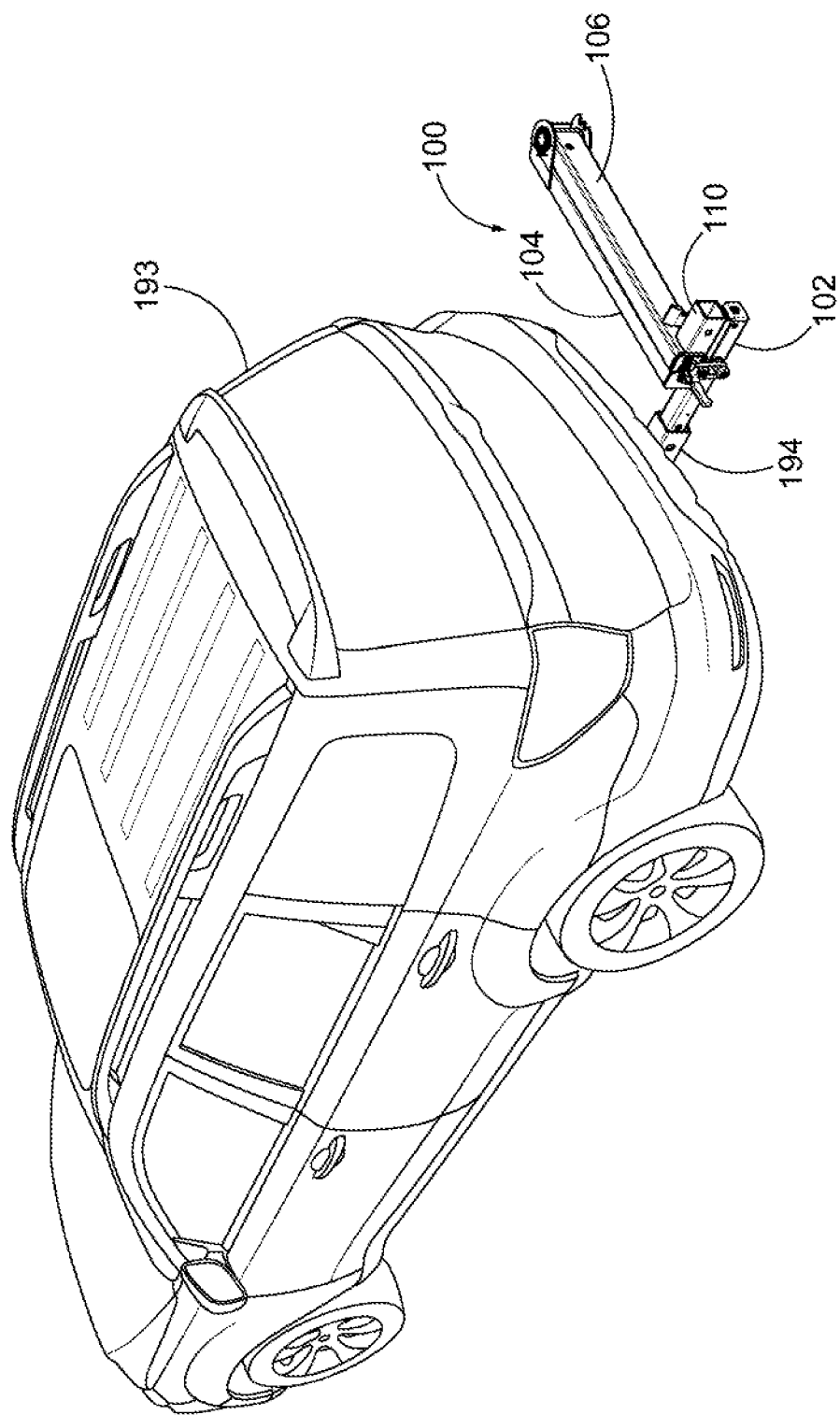
FIG. 16 is a perspective view of an embodiment of the inventive device in a closed configuration attached to a vehicle.
Figure 17:
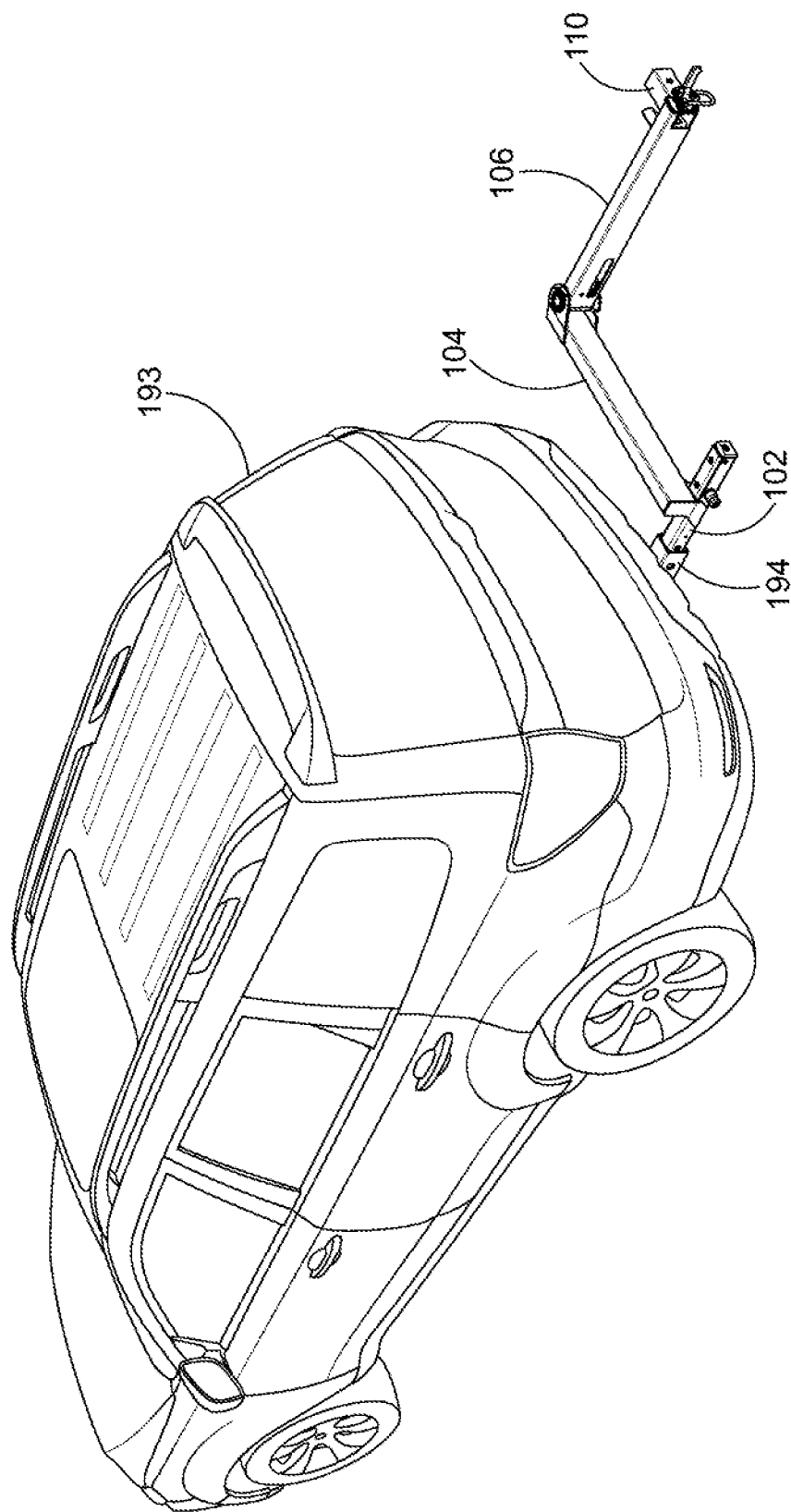
FIG. 17 is a perspective view of an embodiment of the inventive device in an open configuration attached to a vehicle.

The depicted first support member 104 extends substantially perpendicularly to the drawbar 102, although in other embodiments the first support member 104 may extend at a different angle to the drawbar 102. The first support member 104 extends toward one side of the vehicle 193 to which it is attached by drawbar 102 as depicted in FIGS. 16 and 17. In the depicted embodiment, a bottom surface of the first support member 104 is attached to a top surface of drawbar 102 so that the first support member 104 is above the drawbar 102. In other embodiments the first support member 104 may be attached to an end of drawbar 102 so that the first support member 104 and drawbar 102 are in the same horizontal plane, or a top surface of first support member 104 may be attached to a bottom surface of the drawbar 102, or an end of first support member 104 may be attached to a side wall of drawbar 102.

Figure 8:
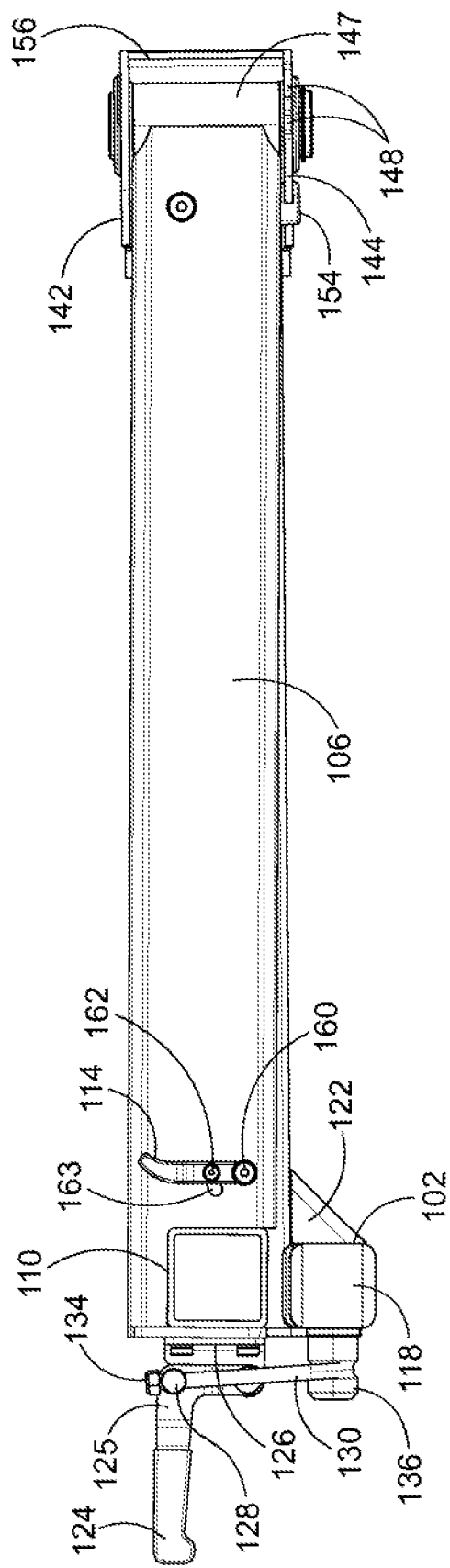
FIG. 8 is a front view of an embodiment of the inventive device in a closed configuration.
Figure 9:
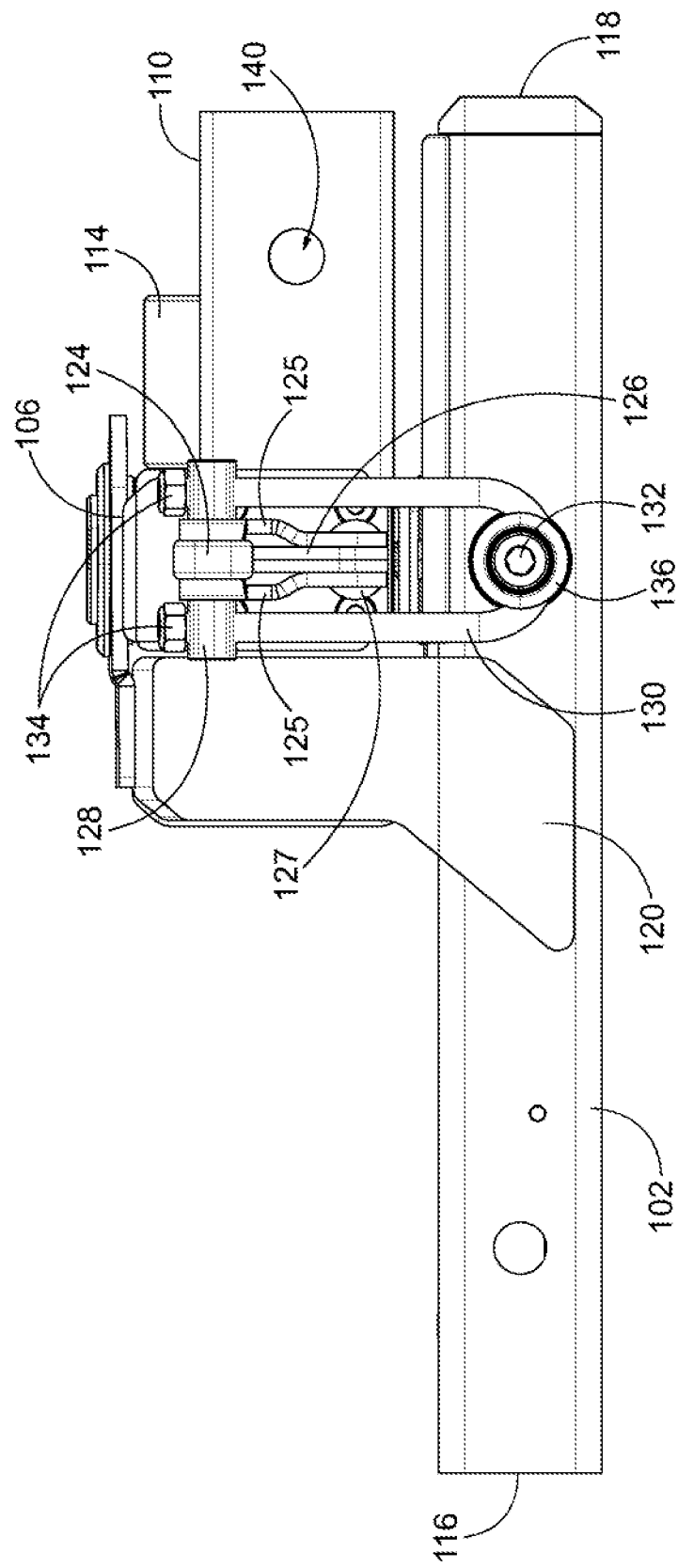
FIG. 9 is a clamp-end side view of an embodiment of the inventive device in a closed configuration.
Figure 10:
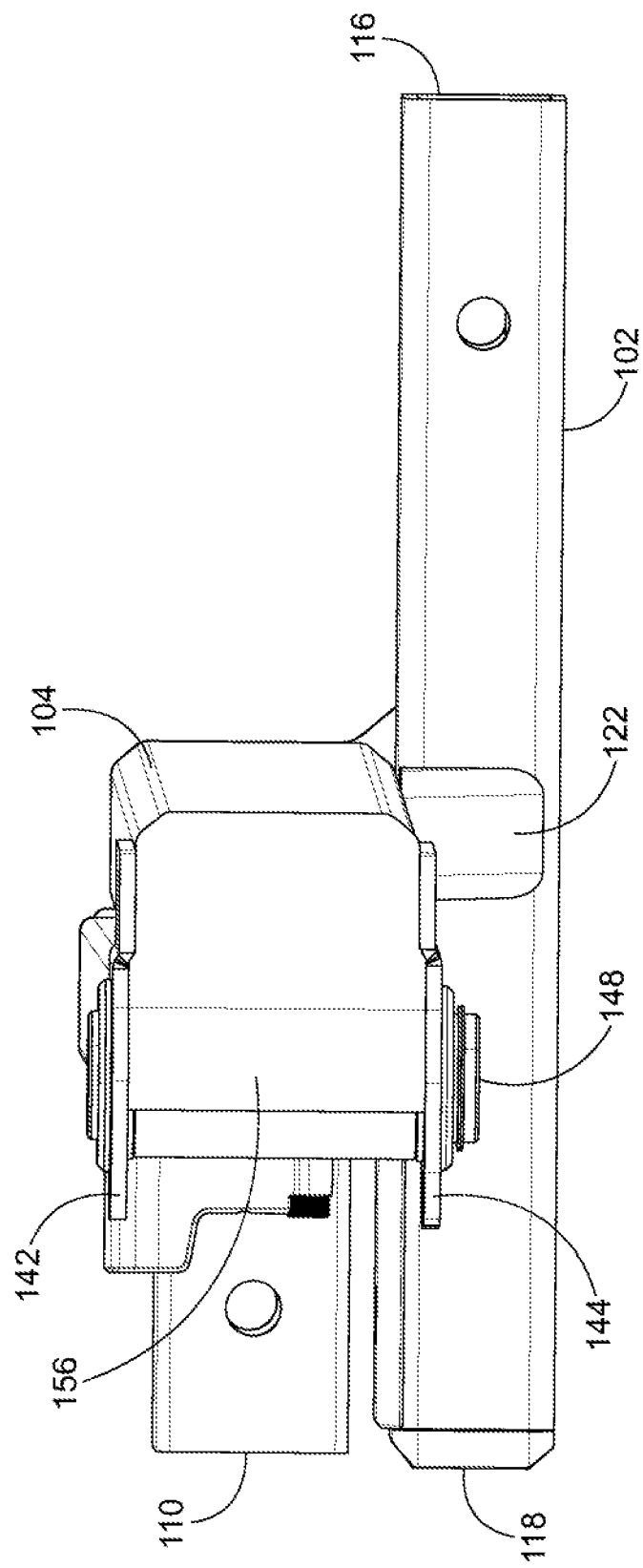
FIG. 10 is a pivot-end side view of an embodiment of the inventive device in a closed configuration.

In the depicted embodiment, the first support member 104 is permanently attached to the drawbar 102, but in some embodiments, the first support member 104 is removably attached to drawbar 102. In some of these embodiments the first support member 104 may be configured to attach to the drawbar 102 in either direction from drawbar 102, that shown in the figures extending to the right of the drawbar when viewed from the front as shown in FIG. 8, but also to the left of drawbar 102. In the depicted embodiment, a first end of the first support member 104 is attached to the drawbar 102, though in other embodiments, the first support member 104 may be attached to the drawbar 102 at a point along its length.

At some point on the length of the first support member 104 a pivotal attachment 108 is provided to support a second support member 106. In the depicted embodiment, the pivotal attachment is disposed at a second end of the first support member 104, but that need not be the case in all embodiments. A second support member 106 is attached to the pivotal attachment 108 as well so that the second support member 106 may pivot toward and away from the first support member 104. In the depicted embodiment the second support member is attached to the pivotal attachment at a first end of the second support member 106, however in other embodiments the pivotal attachment 108 may be attached to a point along the length of second support member 106.

The length of first and second support members 104 and 106, and the attachment point of member 104 to drawbar 102, and the location of the pivotal attachment 108, all may vary from one embodiment to the other. The selection of these parameters may vary so long as they are selected so that when the second support member 106 is pivoted as shown in FIG. 17 or farther, the equipment attached to the device 100 will be sufficiently positioned to the side so that there is no interference with the operation of the access door to the back of the vehicle 193.

In the depicted embodiment, the second support member 106 is disposed on the same horizontal plane as the first support member 104. The back and front views in FIGS. 7 and 8, respectively, depict the arrangement of the first and support members 104 and 106 on the same horizontal plane. In other embodiments of the device, either the first or second support member 104 and 106 may be above or below the other member, or may be partially above, below, or beside the other member, or totally above the other member, to the side of the other member, or both simultaneously.

The second support member 106 extends from the pivotal attachment 108 to a location near the point where the vehicle attachment member, such as drawbar 102, would support an equipment rack if used without the inventive device. In the depicted embodiment, the second support member 106 extends from the pivotal attachment to a point near drawbar 102. In this embodiment, the second support member 106 is disposed in a horizontal plane that is above drawbar 102. In other embodiments the second support member may be disposed in a horizontal plane that is below or on the same plane as that of the drawbar 102.

An equipment rack attachment device is provided as part of or attached to the second support member 106. In the depicted embodiment, the equipment rack attachment device comprises a receiver socket 110 with an aperture 138 for receiving a drawbar of an equipment rack designed for attachment to a receiver hitch. The receiver socket 110 may also be provided with apertures 140 for bolts, pins, or other devices for securing an equipment rack to the receiver socket 110.

In the depicted embodiment the equipment rack attachment device is attached to the second support member 106 at a point near the second end of the member 106, though in other embodiments it may be attached at a point along the length of the second support member 106. In the depicted preferred embodiment the receiver socket 110 is disposed above the drawbar 102 when the device is in its closed configuration, but it need not be in all embodiments. In the depicted embodiment, the equipment rack attachment device is attached to a side of the second support member 106, but in other embodiments it may be attached to the top, end, side, or bottom of the second support member 106.

The first support member 104, second support member 106, equipment rack attachment device 110, and other components of the device 100 may be formed out of any materials that are light and strong enough to support the weight of an equipment rack attached to device 110, any equipment attached to the rack, and the weight of device 100 itself. These materials may include steel, aluminum, or other metals, and alloys of them, or composite materials. The material selection is not limited to those available or known now but as new materials with sufficient strength and rigidity to support the device 100, an equipment rack attached to it, and any equipment installed on the rack, those new materials may be utilized to create embodiments of the device 100.

When a vehicle to which the device is attached is in motion, the device 100 is secured in the closed configuration of the device 100 shown in FIGS. 1-12 and 16. When the vehicle is not in motion, the second support member 106 may be pivoted from the closed configuration to one or more open configurations, such as those shown in FIGS. 13-14 and 17. In the depicted embodiment, the second support member 106 pivots through a range starting at 0 degrees in the closed configuration and may extend past 90 degrees, and even to 180 degrees in some embodiments. In some embodiments the range of pivotal motion may only be limited by contact with the vehicle to which the device 100 is attached.

Since the device 100 is utilized on the back of a vehicle that at times is traveling at highway speeds, and will be supporting an equipment rack with substantial weight, plus the equipment (such as 1-4 bicycles) on the equipment rack, it is important that the device 100 be secure so that accidents do not result from movement or failure of the device 100 during movement of the vehicle. Thus it is important to provide means of securing the second support member 106 in the closed configuration. In the inventive device 100, an easily releasable actuator allows the user to secure the second support arm 106 in several different desired positions along its range of pivotal motion. In addition a clamp assembly 112 may be provided though the clamp assembly 112 is optional and does not limit the scope of the claimed inventive latch assembly.

In the depicted embodiment an optional clamp assembly 112 is also provided to secure the second support member 106 in the closed configuration by pulling it against the top surface of drawbar 102. In other embodiments, the clamp assembly 112 might clamp or pull the second support member 106 toward or against the first support member 104 or another component of the device 100. In some embodiments the clamp assembly 112 may be omitted from the device 100 without departing from the scope of the inventive device 100.

Figure 7:
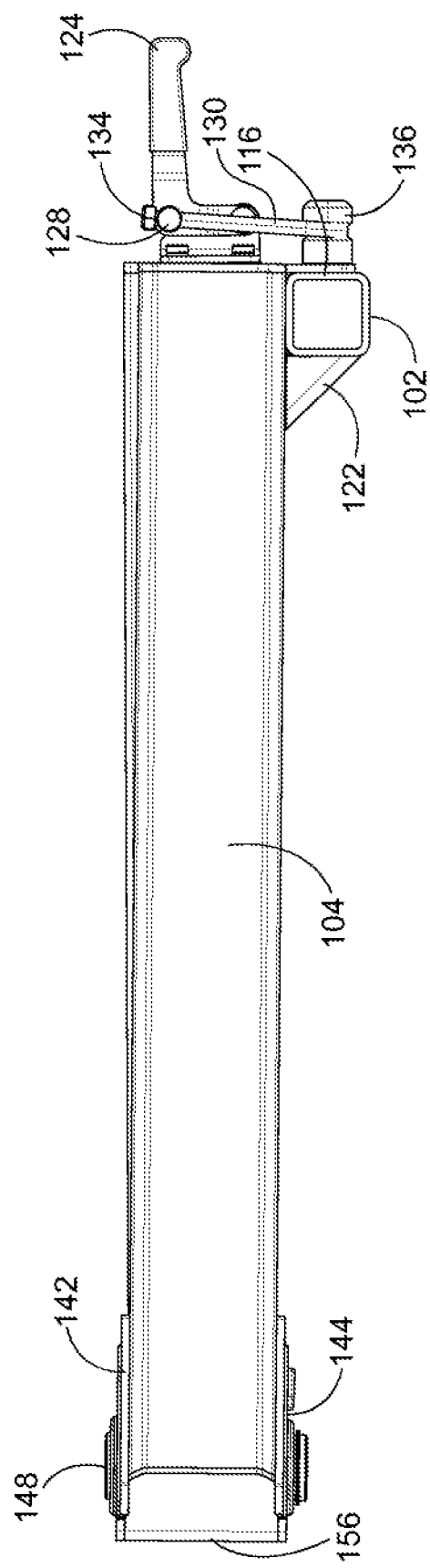
FIG. 7 is a back view of an embodiment of the inventive device in a closed configuration.

In the depicted embodiment, the optional clamp assembly 112 includes an actuator handle 124 that a user manipulates to engage and disengage the clamp assembly 112. In this embodiment the handle 124 extends horizontally from the device 100 when it is in the engaged, as shown in FIGS. 7-8. In other embodiments the actuator handle 124 may extend in any direction, such as upwardly or at an angle. In the depicted embodiment, the actuator handle 124 is attached to one or more arms 125 to attach the handle 124 to the device 100. In the depicted embodiment, there are two arms 125 that extend downwardly from the handle 124. A bracket 126 is provided on the device 100 and a pivot pin 127 pivotally attaches the arms 125 to the bracket 126. In the depicted embodiment, bracket 126 is attached to the second support member 106, but in other embodiments it may be attached to other components of the device 100 or to the drawbar 102.

In the depicted embodiment, a cross pin 128 is attached to the actuator handle 124. A clamp bar 130 depends from the cross pin 128. In the depicted embodiment, the clamp bar 130 is a rod that has been bent into a U shape to extend downwardly from the cross pin 128 on each side of the actuator handle 124. In a preferred embodiment, either the cross pin 128 is pivotally mounted to the actuator handle 124 or the clamp bar 130 is pivotally attached to the cross pin 128. Embodiments with one or both of these pivotal connections allow the clamp bar 130 to depend substantially vertically down from the handle 124 no matter what position the handle 124 is in with respect to bracket 126. In the depicted embodiment, the ends of clamp bar 130 are threaded rods that are inserted through holes in cross pin 128 and secured there by nuts 134.

The clamp bar 130 engages a clamp post 132 that is attached to another part of the device 100 or to a separate element such as drawbar 102. In the depicted embodiment, the clamp post 132 is attached to drawbar 102. In some embodiments, the clamp post 132 may be provided with one or more flanges 136 to create a lip or channel to prevent slippage of the clamp bar 130 off of the clamp post 132. The lip or channel may also be created by features on clamp post 132 itself instead of a separate component. In the clamped position shown in FIG. 9 among others, clamp bar 130 engages with clamp post 132 to pull downwardly on the second support member 106 to hold it in place. In some embodiments, the effective length of the clamp bar 130 is adjusted by rotating nuts 134 so that the second support member 106 or receiver socket 110, or both, are in contact with the top surface of the drawbar 102 or a pad attached thereto.

When the actuator handle 124 is pivoted downwardly, clamp bar 130 will disengage clamp post 132 thus releasing the clamp assembly 112 and allowing the second support member 106 to pivot with respect to the first support member 104.

In the depicted embodiment of the inventive device 100, the pivotal attachment 108 of the first and second support members 104 and 106 together is provided by a barrel hinge. In other embodiments, the pivotal attachment 108 may be another type of hinge or other assembly capable of the described pivotal movement. Referring now to the embodiment depicted in the figures, the pivotal attachment 108 includes a top plate 142 and a bottom plate 144. The top place 142 is fixedly attached to the top of first support member 104, though in other embodiments it could be attached to the side or end of the member 104. The bottom plate 144 is fixedly attached to the bottom of first support member 104, though in other embodiments it could be attached to the side or end of the member 104.

In the depicted embodiments the top and bottom plates 142 and 144 extend outwardly from the first support member 104 toward the second support member 106. The top and bottom plates 142 and 144 are capable of receiving and securing a hinge barrel 146 between them. In varying embodiments, the hinge barrel 146 may be able to rotate along its axis while secured by the plates 142 and 144, while in other embodiments it may be fixed with relation to the plates 142 and 144. In some embodiments the top and bottom plates 142 and 144 may be provided with an aperture for receiving the hinge barrel 146. In some embodiments retaining rings 190 on the hinge barrel 146 may be used to hold the hinge barrel 146 in relation to the top and bottom plates 142 and 144. Other commonly used elements such as bushings or bearings may be used in some embodiments to allow the pivotal motion of the second support arm 106.

In other embodiments the hinge barrel 146 may be a bolt or comprise two separate appendages or pins extending from the top and bottom plates 142 and 144 respectively. A person of skill in the art of designing such pivotal attachments and hinges will be able to design many alternative pivotal attachments 108 that are within the scope of the invention. The pivotal attachment 108 defines the axis around which second support member 106 is capable of pivoting when a user releases it and is not limited to the specific structure shown in the figures.

In the depicted embodiment, the second support member 106 is pivotally retained by the hinge barrel 146 between the plates 142 and 144 by outer hinge barrel 147 that is fixedly attached to the second support member 106. In this embodiment, outer hinge barrel 147 is substantially a cylinder that receives the cylindrical hinge barrel 146. In other embodiments, the outer hinge barrel 147 may comprise apertures in second support member 106 or in its internal components, or outer hinge barrel 147 may extend only partially across the second support member 106, it may be two or more segments that are separated from one another, or it may not be present at all.

In other embodiments, the orientation of the pivotal attachment may be reversed, with the top and bottom plates 142 and 144 attached to the second support member 106, and the other hinge elements described above attached to the first support member 104.

When no clamp assembly 112 is provided, or when the clamp assembly 112 is disengaged and the second support member 106 is free to pivot or swing with respect to the device 100, it is still desired to have some means of releasably securing the second support member 106 in one or more desired positions to prevent random or undesired movement of the second support member 106 due to tilt of the vehicle, accidental contact by a person, as a backup if the optional clamp assembly 112 is not engaged during vehicle movement, or for other reasons. The inventive device includes a novel mechanism for engaging and releasing a latch to hold the second support arm 106 at one of several desired positions and to prevent unwanted movement of the second support arm 106.

In some embodiments, the latch assembly comprises a latch actuator 114 and a latch mechanism that is unlatched by user manipulation of the latch actuator 114. The latch actuator 114 may be connected to the latch mechanism by a connecting member such as connecting rod 158. In the depicted embodiment, the latch mechanism comprises a latch bar 154 and a latch member 144. The latch bar 154 is attached to one of the support members that releasably engages a latching feature, such as latching features, or apertures, 148, in or on a latch member 144 attached to the other support member. The apertures 148 are positioned on the latch member 144 to engage the latch bar 154 when the two support members are positioned at certain desired angles with respect to each other. The latch bar 154 engages, or extends, into the aperture and prevents relative motion of the two support members 104 and 106. In the depicted embodiment, the latch assembly further comprises an actuator that a user manipulates to disengage the latch bar from an aperture in the latch plate or to allow the latch bar to engage with an aperture.

In the depicted embodiments, latching features 148 comprise apertures, notches, or indentations in the edge of latch member 144 having a substantially square shape. In other embodiments the apertures 148 may comprise notches of other shapes, such as triangular, polygonal, or arcuate notches, or holes of various shapes that are not directly on the edge of the latch member 144. In other embodiments the latching features may extend outwardly or upwardly from the latch member to provide the same function as the depicted notches, namely to engage the latch bar 154 to prevent pivotal movement of the two support members 104 and 106 with respect to each other.

In various embodiments, the latch mechanism is also provided with a biasing mechanism 166 to apply force to the latch bar 154 to cause it to engage an aperture 148 in the latch member 144 as soon as they are aligned with one another. The actuator 114 is connected to the latch bar 154 by a connecting element 158 such that when a user manipulates the actuator 114, the connecting element 158 transmits that force to the latch bar 154 to counteract the force of the biasing mechanism 166 and disengages, or retracts, the latch bar 154 from the aperture 148 in the latch member 144.

In the depicted embodiment, several of the components of the inventive latch assembly are largely contained inside the support member. The support member may be hollow or have a cavity or lumen. In other embodiments, some or all of the components of the latch assembly may be disposed on the inside of another component of the device 100 such as first support member 104. In other embodiments, some of the components of the latch assembly may be disposed all or partially outside the first or second support members 104 and 106. In some embodiments, the portions of the latch assembly depicted outside of the second support member 106 may be disposed inside member 106 or some other part of device 100 such as member 104.

In the depicted embodiment, the actuator 114 is pivotally attached to the outer surface of the front side of the second support member 106. This actuator 114 allows a user to release the latch assembly so that the second support member 106 may be pivoted to a desired position. The depicted embodiment includes an actuator pivot pin 160 such as a bolt or pin that extends through an aperture in the actuator 114 and into an aperture (such as a threaded hole) in support member 106. The actuator 114 may then pivot around the pin 160 from a latched position shown in FIG. 11 to an unlatched position shown in FIG. 12.

In a preferred embodiment the actuator 114 is located on the support member at a position that is closer to the receiver drawbar 102 than to the pivotal attachment 108. Preferably, the actuator 114 is within reach of a user standing by the receiver drawbar. In other embodiments the actuator 114 translates in a different manner then shown in the depicted embodiments. For example, it may pivot outwardly away from the side of support member 106 from a latched position that is substantially parallel to or flush with the outside surface of the support. Another example is an actuator 114 that slides back and forth or up and down on or parallel to the outer surface of a support member. Other configurations of actuator 114 may be utilized in various embodiments of the device.

Movement of the actuator 114 causes the latch bar 154 to disengage from the latch member 144. Once the second support member 106 has been pivoted a relatively small angle, the actuator 114 may be released by the user. If the latch bar 154 no longer aligns with an aperture 148 then the latch assembly will not engage and the member 106 may continue to be pivoted until the latch assembly reaches another automatic latch position. The automatic latch positions occur whenever the latch bar 154 aligns with one of the apertures 144 so that the biasing mechanism 166 can force the latch bar 154 into the aperture 148. The latch assembly then automatically engages or latches to hold the second support member 106 in the desired position.

Figure 11:
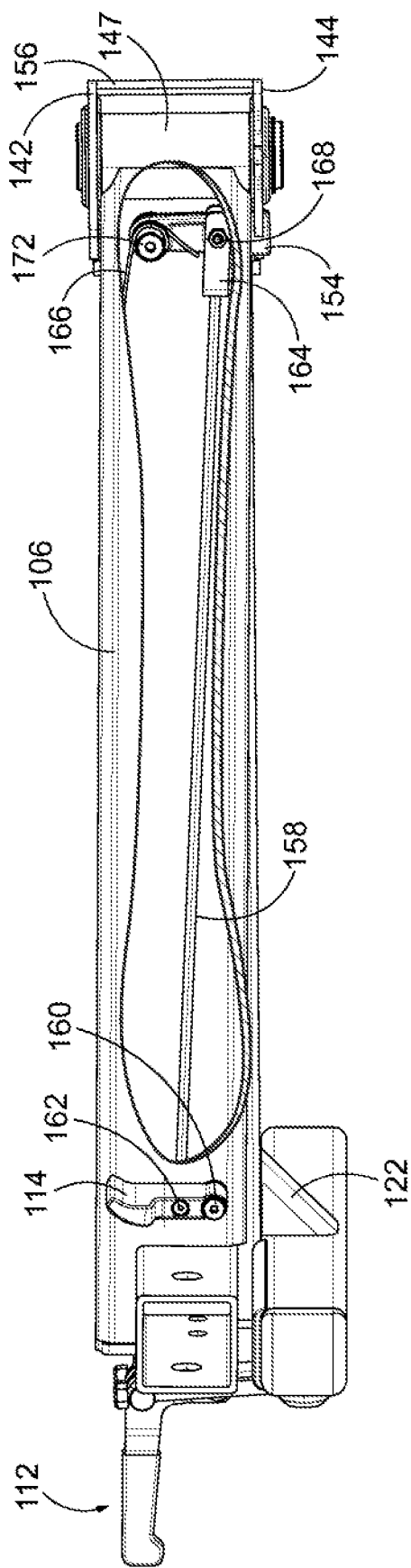
FIG. 11 is a cut-away front view of an embodiment of the inventive device in a latched configuration.

FIG. 11 depicts a cut-away view of an embodiment of the device in a latched configuration. In this view, one side of the second support member 106 is cut away to show the components of the latch assembly that are substantially inside the member 106 in this embodiment. In other embodiments some or all of these components may be partially or fully disposed outside of second support member 106, inside first support member 104, or some other member. In a preferred embodiment the latch assembly components are substantially inside a support member 104 or 106 to protect them from the environment, dirt, and other potentially damaging interactions or wear and tear.

Figure 19A:
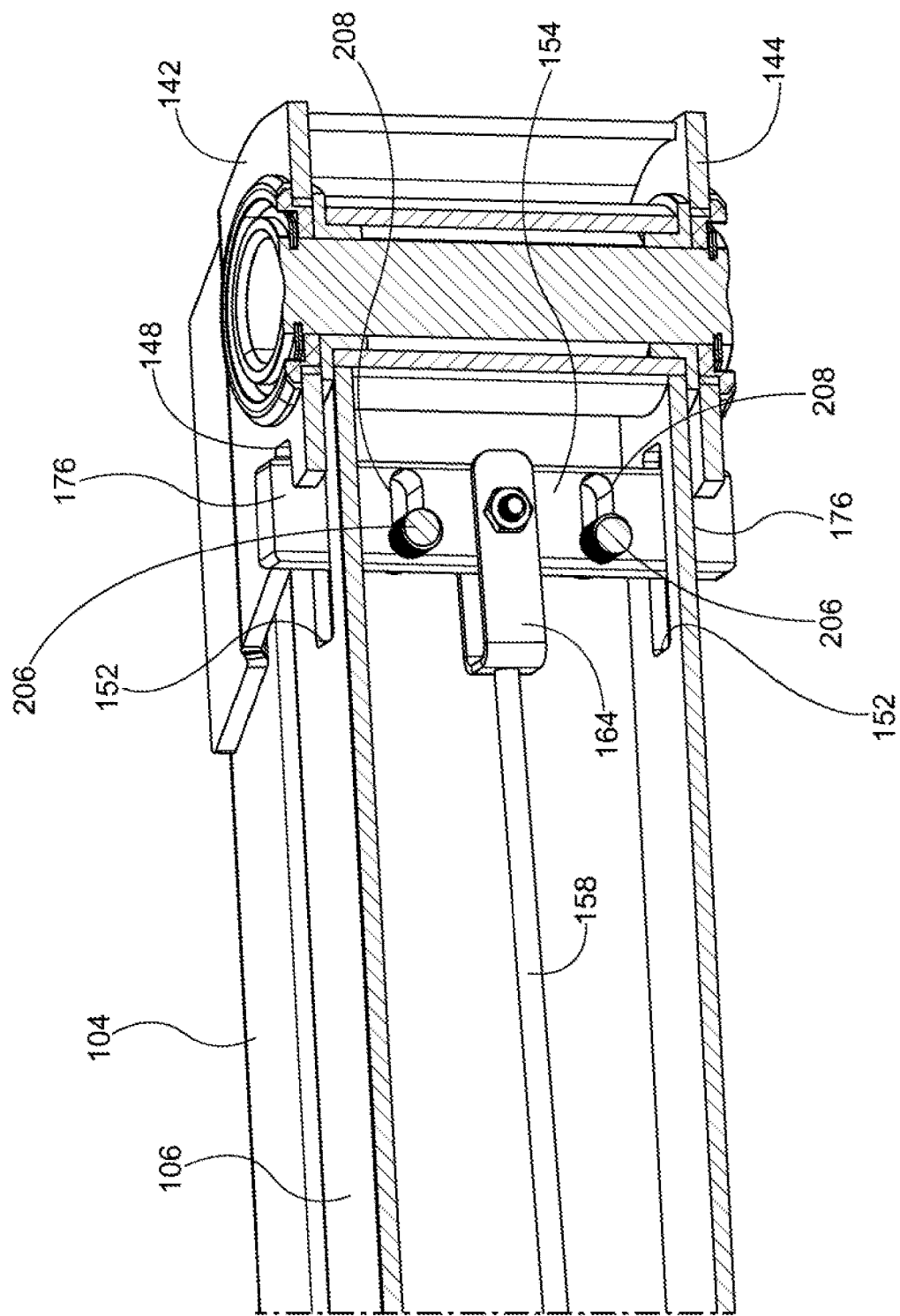
FIG. 19A is a cross-sectional view of a portion of an additional embodiment of the inventive device in a latched configuration.
Figure 19B:
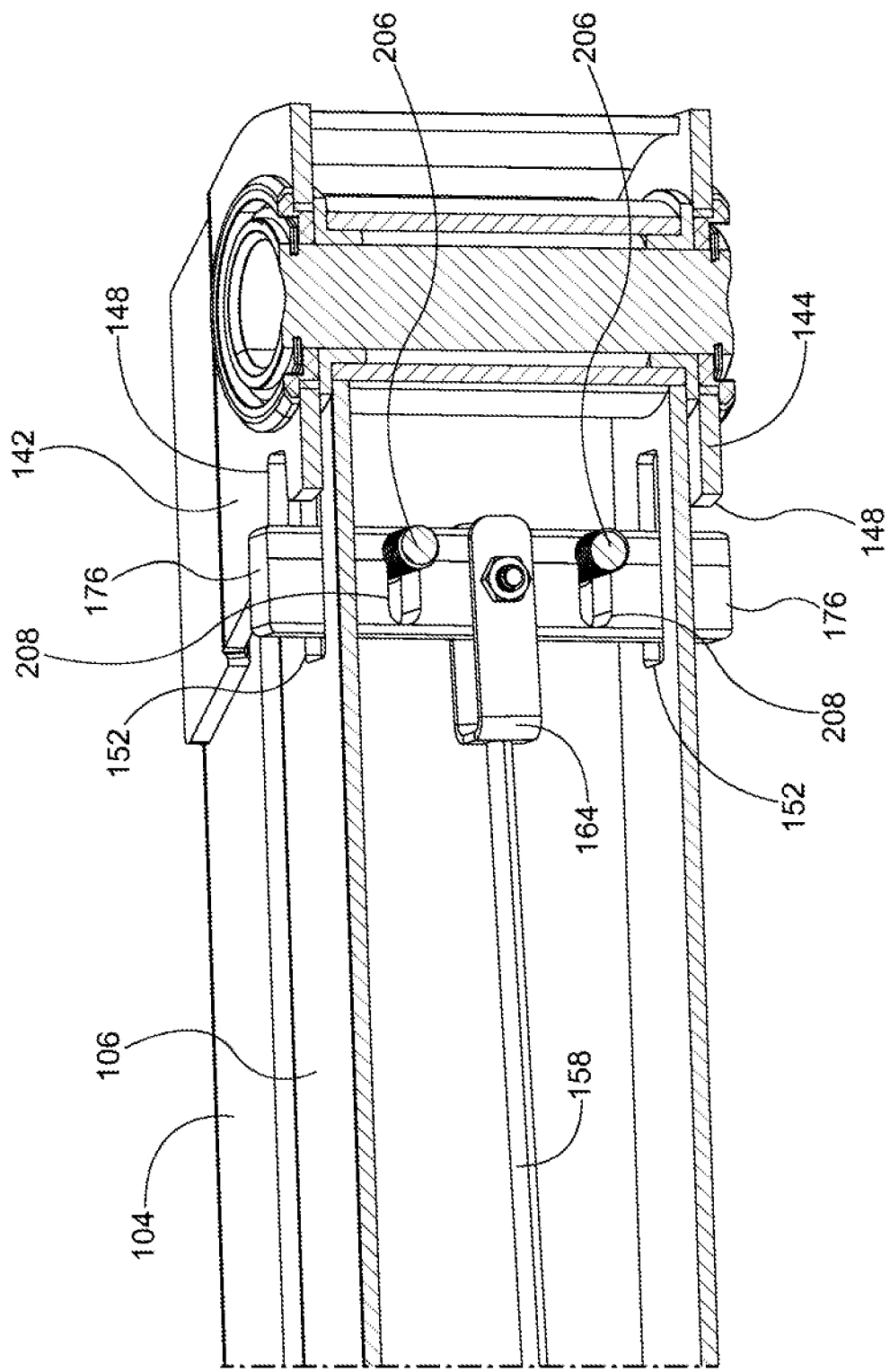
FIG. 19B is a cross-sectional view of a portion of an additional embodiment of the inventive device in an unlatched configuration.

As shown in FIG. 11, in the depicted embodiment latch bar 154 is pivotally attached to the second support member 106 at a pivot axis. In the depicted embodiment the pivot axis is secured by pivot pin 172. The pivot pin 172 may be a bolt, pin, or other similar device for pivotally attaching the latch bar 154 to the support member 105 while allowing it to pivot from the latched position shown in FIG. 11 to the unlatched position shown in FIG. 12. In the depicted embodiment, pivot pin 172 is a bolt inserted through apertures in the second support member 106 and latch bar 154. In other embodiments, the pivot pin 172 may comprise appendages from latch bar 154 that engage brackets or sockets in the second support member 154, or two separate pins extending outwardly from latch bar 154 or inwardly from support member 106. While the depicted latch bar 154 is pivotally attached to the second support member 106, in other embodiments the latch bar 154 may be linearly translatable either vertically or axially toward or away from the pivotal attachment. The varying devices and components for attaching the latch bar to the support member are referred to herein as the attachment features of the latch bar. These attachment features may vary between embodiments of the inventive latch assembly and are not limiting of the scope of the inventive device. For example, rails and grooves, or posts and slots (as depicted in FIGS. 19A and 19B) may be provided as attachment features to allow the latch bar to slide back and forth as necessary for operation of the latch mechanism.

In a preferred embodiment the latch actuator 114 is adjacent to or in proximity to the receiver socket 110 or the vehicle attachment point when the second support member 106 is in the closed position. In a preferred embodiment the latch bar 154 is adjacent to or in proximity to the pivotal attachment 108. In these contexts, "adjacent to" or "in proximity to" mean closer to that point on the support member then to the pivotal attachment 108.

A connecting rod 158 extends from the actuator 114 to the latch bar 154. In the depicted embodiment, the connecting rod 158 is pivotally connected to both the actuator 114 and the latch bar 154. In some embodiments the attachment of the connecting rod 158 to the actuator 114 or the latch bar 154 may not be pivotal if the rod 158 is flexible enough to accommodate the movement of the actuator 114. In some embodiments the connecting rod 158 may be a rigid rod, a semi-rigid rod, a wire, a cord, or other similar product such that when the connecting rod 158 is pulled toward actuator 114 by a user translating actuator 114, that it will have sufficient strength to translate the latch bar 154 without substantially stretching or breaking. In some embodiments the connecting rod 158 may be rigid so that pressure on the actuator 114 toward the latch bar 154 may exert pressure on latch bar 154, but such rigidity is not necessary for the operation of the inventive device.

In the depicted embodiment, a first end of the connecting rod 158 is attached to the actuator 114 by a pivot pin 162 such as a bolt or other suitable attachment, and a second end of the connecting rod 158 is attached to the latch bar 154 by an optional bracket 164. The depicted bracket 164 extends from the connecting rod 158 on both sides of the latch bar 154, and is pivotally attached to the latch bar 154 by a pin or bolt 168 that extends through apertures in the bracket 164 and latch bar 154. The pin 168 may be secured on the bracket or bar by one or more threaded nuts, cotter pins, retaining rings, or other similar devices such as nut 170.

In the depicted embodiment, the connecting rod 158 is attached to the actuator 114 by pivot pin or bolt 162. In the depicted embodiment, the connecting rod 158 has a threaded aperture in the end of a perpendicular portion of first end 192 for receiving the end of bolt 162. In other embodiments, the perpendicular portion of the rod 158 may be replaced with an extension of pin 162 or a bracket, or other connection means.

In the depicted embodiment, an elongated aperture 163 is provided through the side wall of second support member 106 to allow bolt 162 to connect to the connecting rod 158 or vice versa and to move within the slot 163 as the actuator 114 pivots to and from the latched and unlatched positions. The ends of aperture 163 may serve as a motion-limiting stop to prevent motion of the actuator 114 beyond desired limits by contact between the edge of the aperture and the bolt 162, the connecting rod 158, or the actuator 114.

Figure 20A:
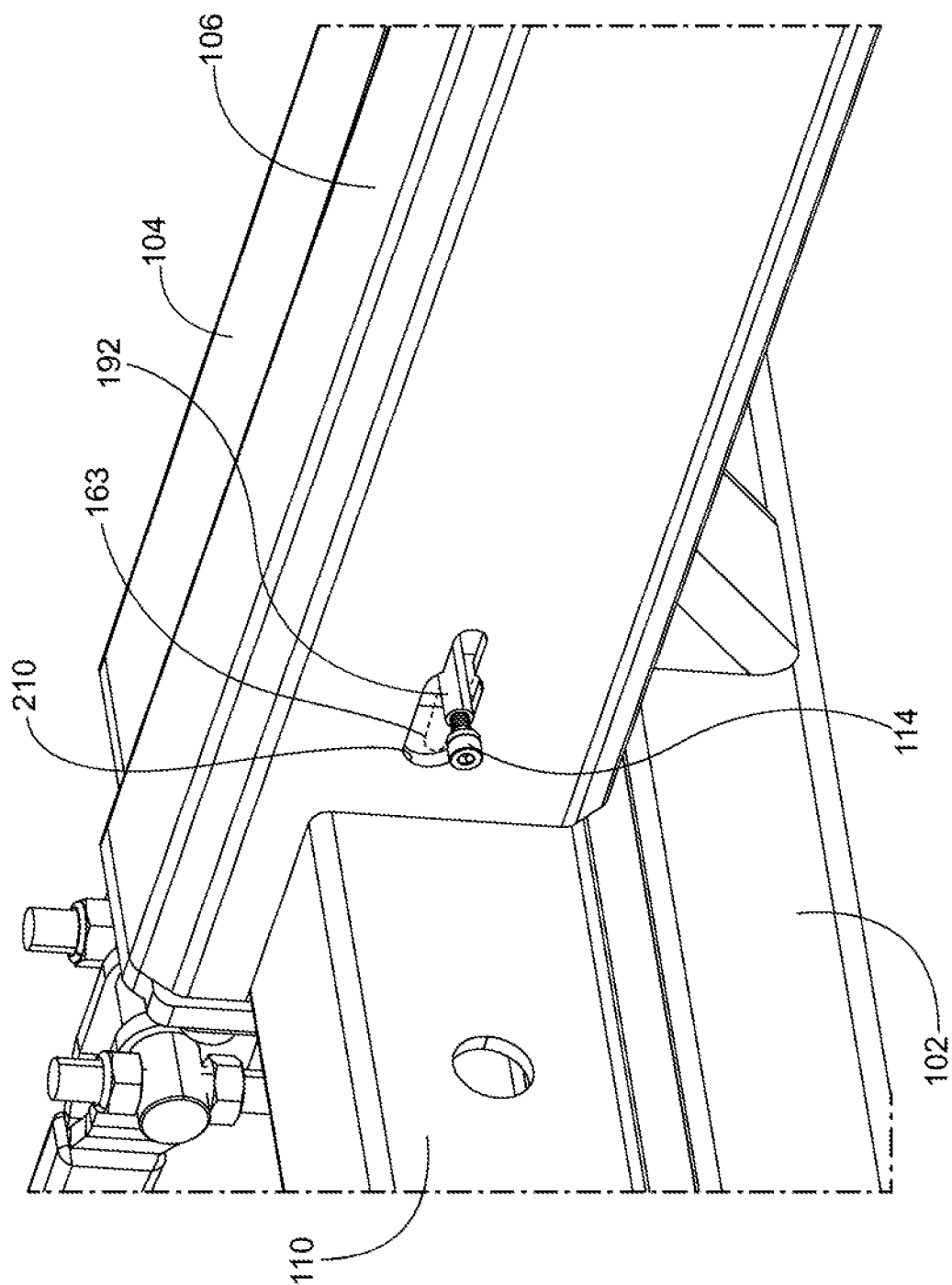
FIG. 20A is a perspective view of a portion of an additional embodiment of the inventive device.
Figure 20B:
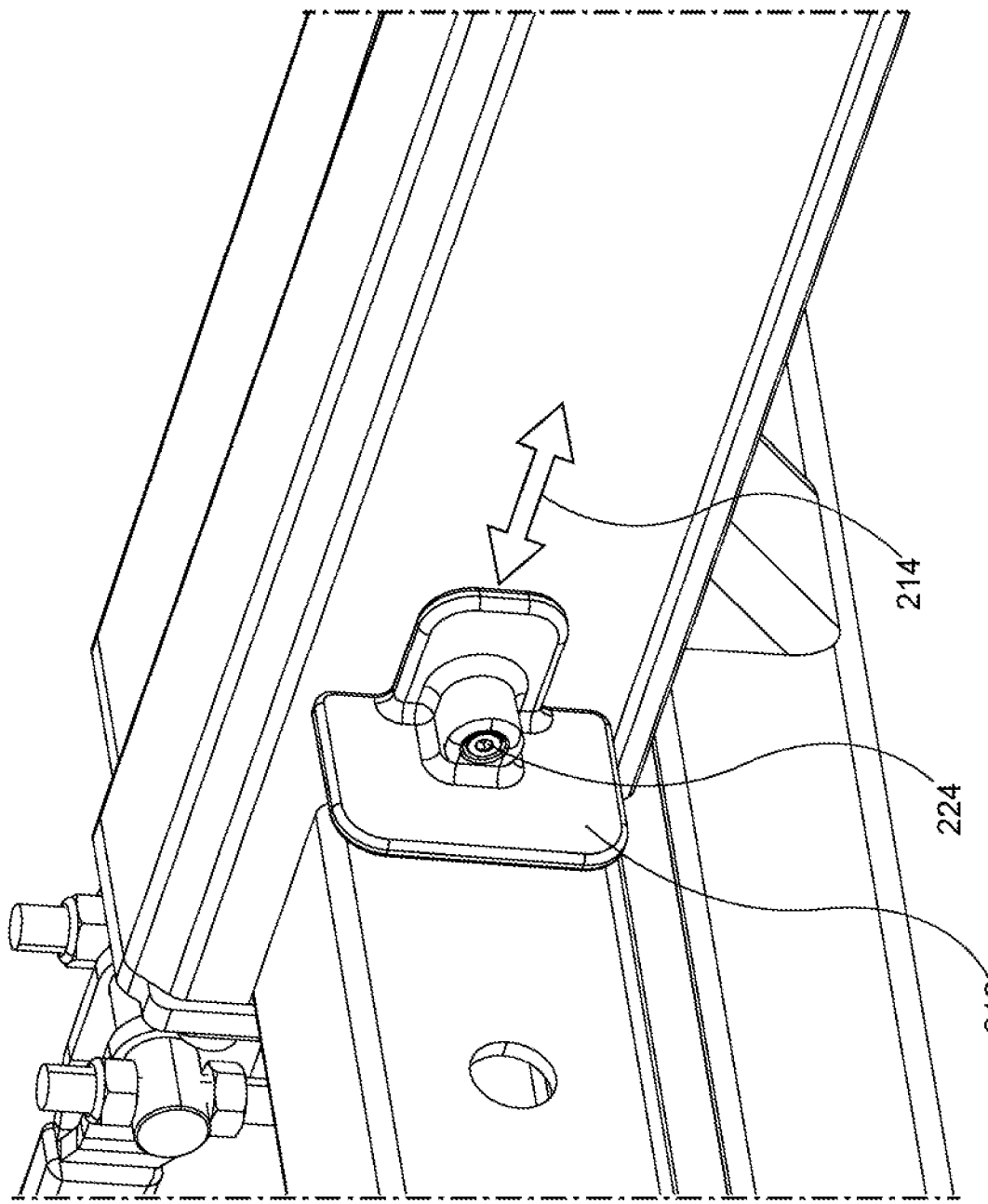
FIG. 20B is a perspective view of a portion of an additional embodiment of the inventive device.

In some embodiments, the actuator 114, latch bar 154, and other components may not be attached pivotally to the support member 106. In these embodiments, one or more of these components may be linearly translatable on the support member 106. For example, actuator 114 may slide from side to side on support member 106 on rails or in grooves, instead of pivoting around pin 160, such as shown in FIGS. 20A and 20B. Similarly, latch bar 154 may be translatable within the support member 106 in a non-pivotal manner, whether linear or otherwise, such as on support posts as shown in FIGS. 19A and 19B, or on rails, grooves, or other means of connection that allows for linear movement of the latch bar with respect to the support member 106.

The latch bar 154 releasably engages with the pivotal attachment 108 to selectively secure the second support member 106 in one or more desired positions with respect to first support member 104. This selective engagement of the latch is provided by apertures 148 in latch member 144. In the depicted embodiment latch member 144 is incorporated into the bottom plate 144 of the pivotal attachment 108. In other embodiments the latch member 144 may be disposed inside the second support member 106, or comprise part of hinge barrel 146. In some embodiments, the apertures 148 comprise notches that are disposed at varying angles from the lengthwise axis of the first support member 104, such as 0, 90, and 120 degrees, although more or fewer notches 148 may be provided.

In the depicted embodiment, the body 174 of latch bar 154 extends downwardly so that the lug 176 of latch bar 154 extends through aperture 152 in the bottom of second support member 106 and engages notches 148 in the bottom plate 144. The aperture 152 has dimensions sufficient to allow the latch bar 154 to move from the latched to the unlatched positions, and vice versa. In the depicted embodiment, the aperture 152 is elongated to allow the lug portion 176 of the latch bar 154 to move back and forth with the pivoting of the latch bar 154. In some embodiments the latch bar 154 may extend upwardly from its point of pivotal attachment to second support member 106 and extend out an aperture in the top surface of the second support member 106.

The apertures (in this embodiment, notches) 148 receive the lug portion 176 of latch bar 154 and prevent it from moving from side to side due to contact between the lug portion 176 and the edges of the apertures/notches 148. In preferred embodiments, the width of the lug 176 is slightly smaller than the width of the notches 148 so that the lug 176 may be received by the notches 148 without substantial binding, but also without allowing substantial side-to-side movement of lug 176 when it is disposed in a notch 148. The edge 150 of the bottom plate 144 between the notches 148 allows the lug 176 to slide along the edge until the lug 176 engages with the next notch 148. The edge 150 of latch member 144 may be arcuate to mirror the pivotal path of the lug 176 as the second support member 106 pivots around the pivotal attachment 108.

The latch bar 154 is attached to the second support member 106 in a manner that allows it to be translated to move the lug 176 into and out of the notches 148. In preferred embodiments, the latch bar 154 is pivotally attached to the second support member 106 in an interior cavity thereof. In the depicted embodiment, the pivotal attachment comprises pivot pin or bolt 172. In the depicted embodiment the latch bar 154 is provided with an aperture 178 for receiving the bolt 172 so that latch bar 154 is pivotally supported by the bolt 172. In preferred embodiments, the latch bar 154 is biased to pivot or translate toward the notches 148 so that when a user is not holding the actuator 114 in the unlatched position, the lug 176 will move into a notch 148 as soon as it is aligned therewith.

The mechanism for biasing the latch bar 154 may vary in different embodiments, and may incorporate extension or compression springs attached to the latch bar 154, or biasing of the actuator 114 that is transferred to the latch bar 154 by connecting rod 158. In the depicted embodiment the biasing mechanism comprises a torsion spring 166 disposed around optional sleeves 180 that extends outwardly from each side of the latch bar 154 at or around aperture 178. In other embodiments using a torsion spring, the coils 184 of spring 166 may be disposed directly around the pivot pin 168. In some embodiments, the torsion spring 166 comprises coils 184 that store and release the spring energy to bias the latch bar 154 toward notches 148, a first spring lever 182 that engages the body 174 of latch bar 154, and at least one second spring lever 186 that contact or are attached to the second support member 106. In the depicted embodiment, the spring 155 has the spring lever 182 in a middle portion of the spring 166, two coils 184 on either side thereof, and two spring levers 186 extending from the coils 184. In this embodiment the ends of spring levers 186 contact the inside surface of the second support member 106. The torsion on spring 166 causes the spring levers 182 and 186 to push on latch bar 154 and second support member 106, respectively. This force causes latch bar 154 to pivot as far as possible toward the latch member 144, and when aligned with an aperture 148 the lug portion 174 will engage the aperture 144.

Figure 12:
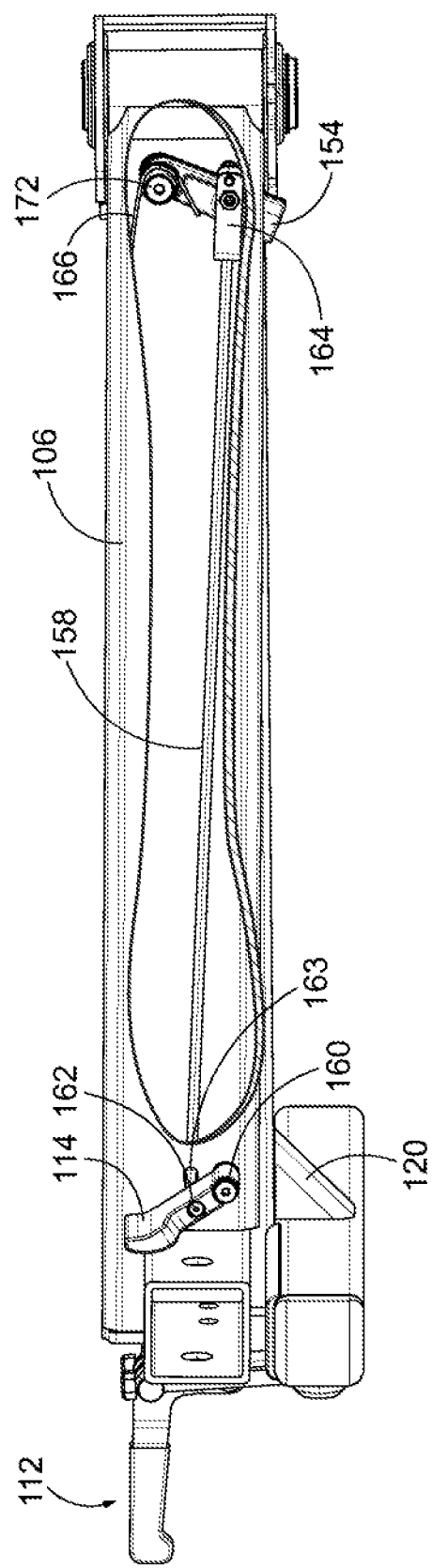
FIG. 12 is a cut-away front view of an embodiment of the inventive device in an unlatched configuration.
Figure 13:
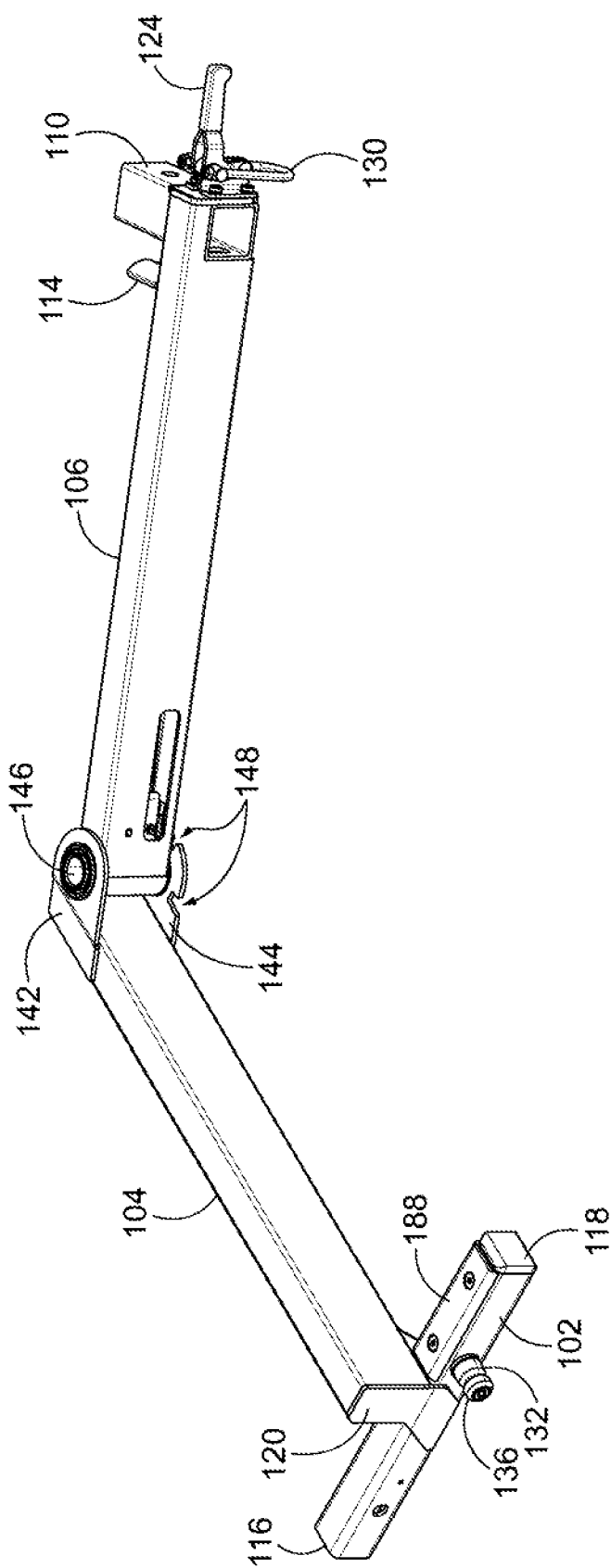
FIG. 13 is a perspective view of an embodiment of the inventive device in an open configuration.
Figure 14:
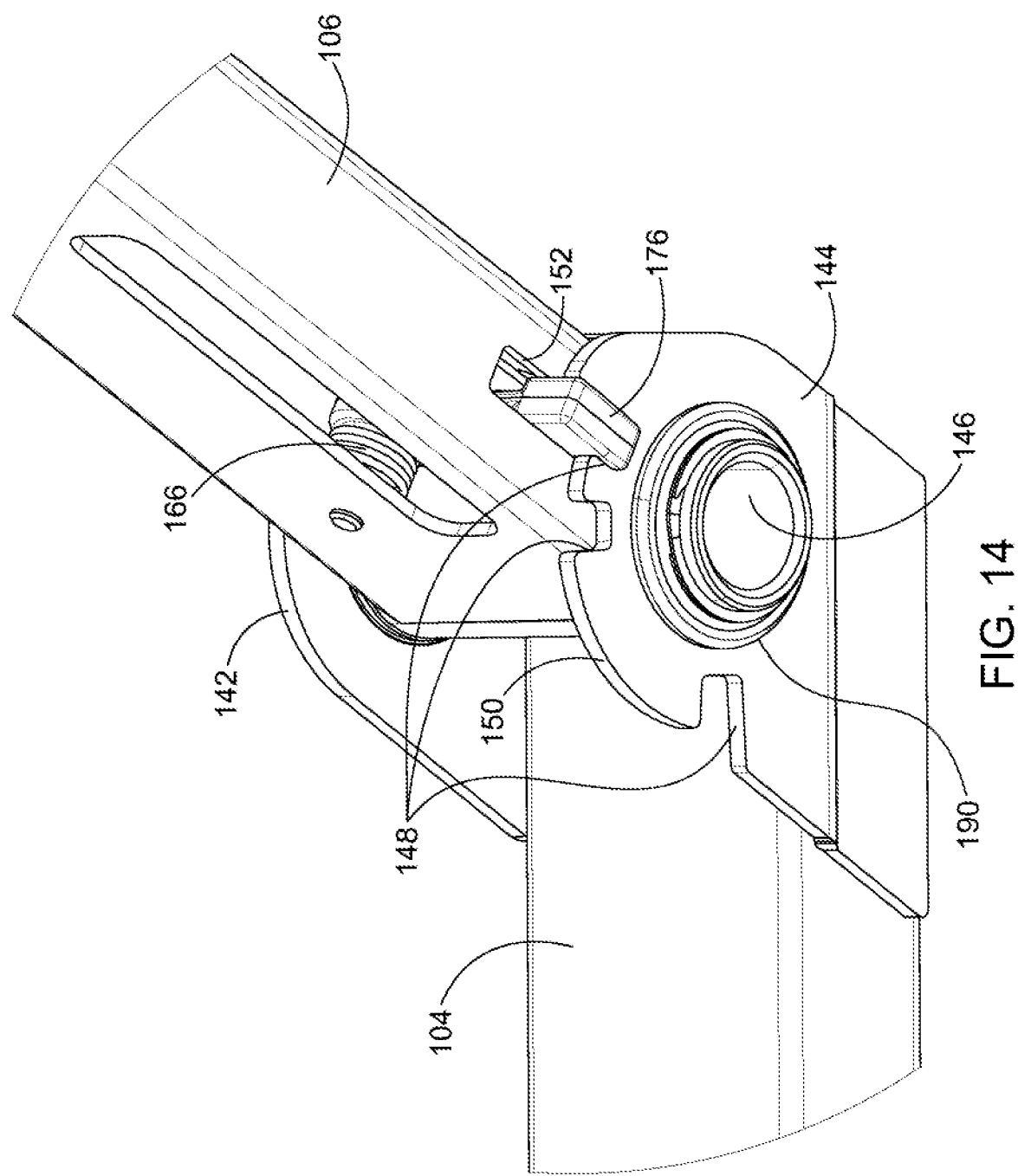
FIG. 14 is a detail view of a portion of an embodiment of the inventive device in an open configuration.

FIG. 12 depicts an embodiment of the device in an unlatched configuration. The actuator 114 has been pivoted to the unlatched position, causing the connecting member 158 to pull the lug portion 174 out of the aperture 148 in latch member 144. In such unlatched position, the second support arm 106 may be pivoted to one of several open positions and the latch allowed to engage a different aperture 148, as shown in FIG. 13, and in a detail view in FIG. 14.

Figure 15:
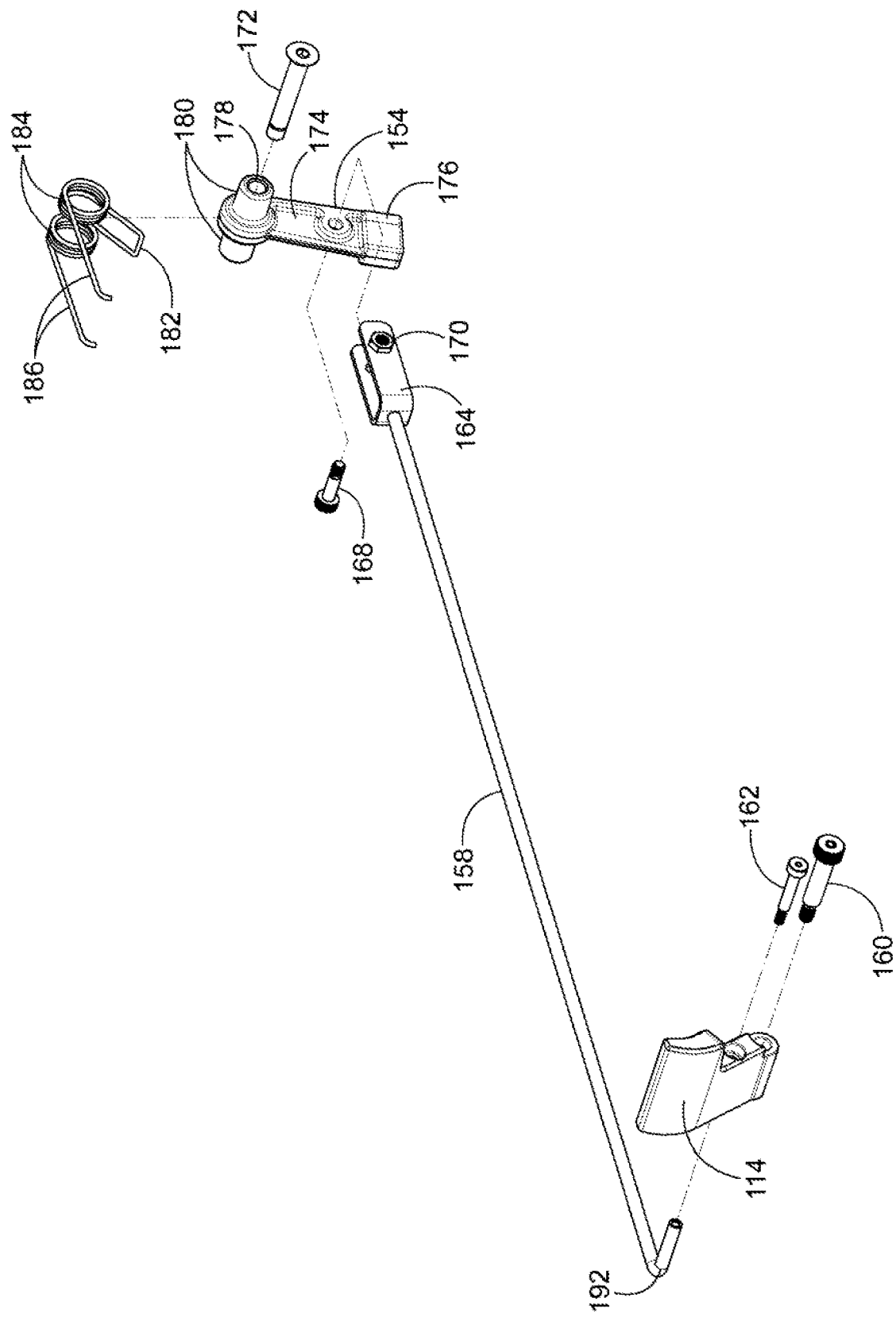
FIG. 15 is an exploded view of an embodiment of the inventive device in an open configuration.

FIG. 15 depicts an exploded view of the components of the latch assembly with the support members removed for the sake of clarity. FIGS. 16 and 17 show the device attached to a vehicle in a closed position and an open position, respectively. In FIG. 16 the second support member is substantially parallel to the first support member along its length though slight variations in the parallelism are acceptable in this embodiment. In other embodiments, the members may not be even substantially parallel in the closed position. In the open position shown in FIG. 17, the second support member is shown at a substantially right angle to the first support member, though other angles between the two members are also considered to be an open position of the device.

Figure 18A:
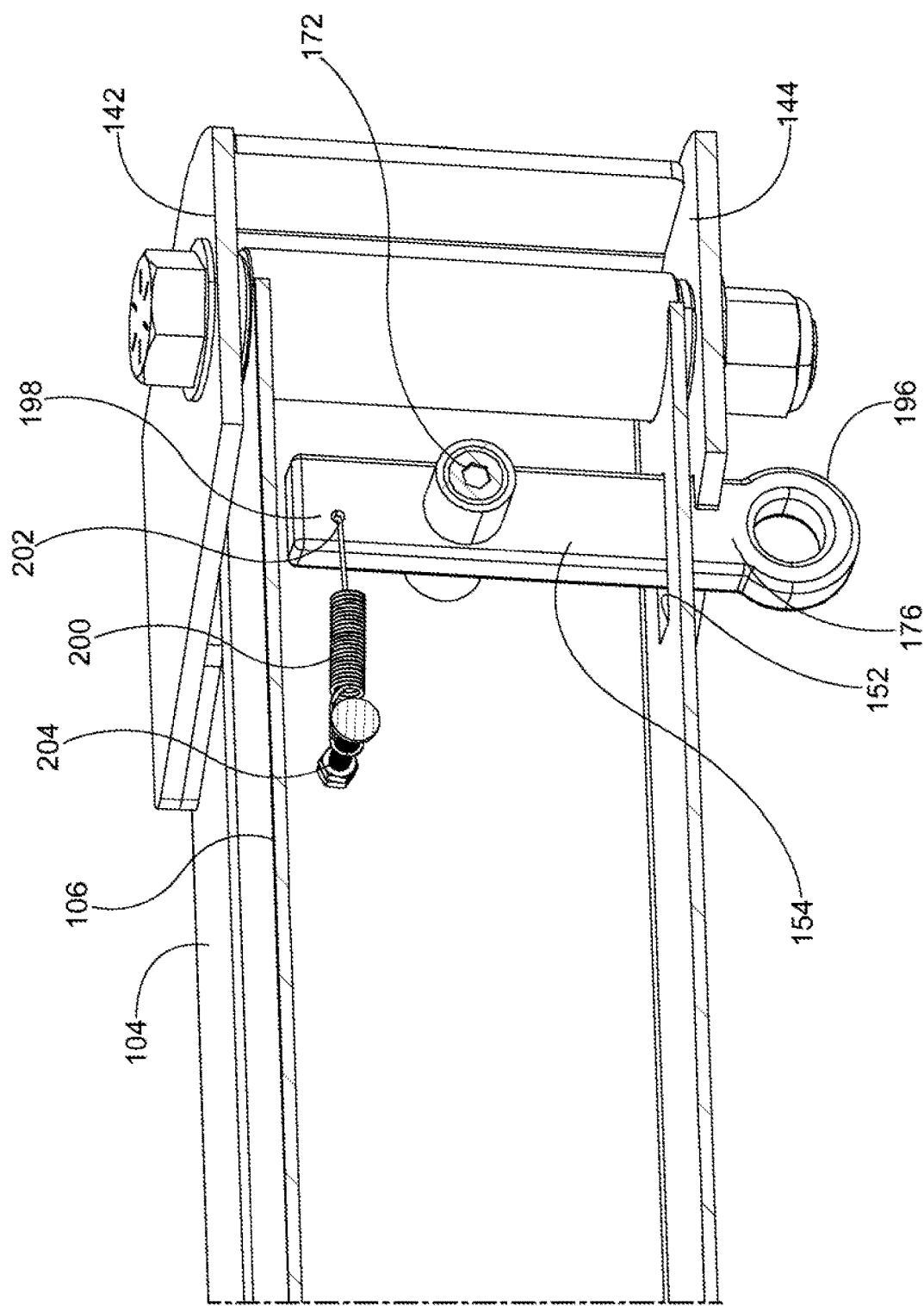
FIG. 18A is a cross-sectional view of a portion of an additional embodiment of the inventive device in a latched configuration.

Additional embodiments of various components are depicted in FIGS. 18A-20C, though other embodiments are also within the scope of the claimed invention. FIGS. 18A and 18B depict an embodiment of the inventive system that do not include a connecting rod, and have the actuator combined with the latch bar itself. FIG. 18A is a cross-sectional view of this embodiment in a latched configuration. In this embodiment the latch bar 154 is pivotally attached to the second support member 106 by a pivot pin 172. The latch bar 154 has a latch bar shaft extending through aperture 152, and a lug 176 that engages the slots 148 in member 144, just as in other embodiments of the device. However, in this embodiment, an actuator 196 is attached to or formed unitarily with the latch bar 154. In the depicted embodiment the actuator 196 is a ring with a central aperture, but in other embodiments it may be a extension of the lug 176, a trigger shape, a handle shape, or any other shape that allows a user to apply sufficient force to the latch bar 154 to overcome the biasing mechanism used to urge the latch bar 154 to the latched position. In the embodiment with the ring, a rope or cord could be attached to the actuator to allow a user to actuate the latch bar 154 from elsewhere. FIG. 18B depicts the latch bar 154 when subject to a force from a user to move the latch bar 154 to the unlatched position so that it no longer engages a slot 148 and allows pivoting of the second support member.

Figure 18B:
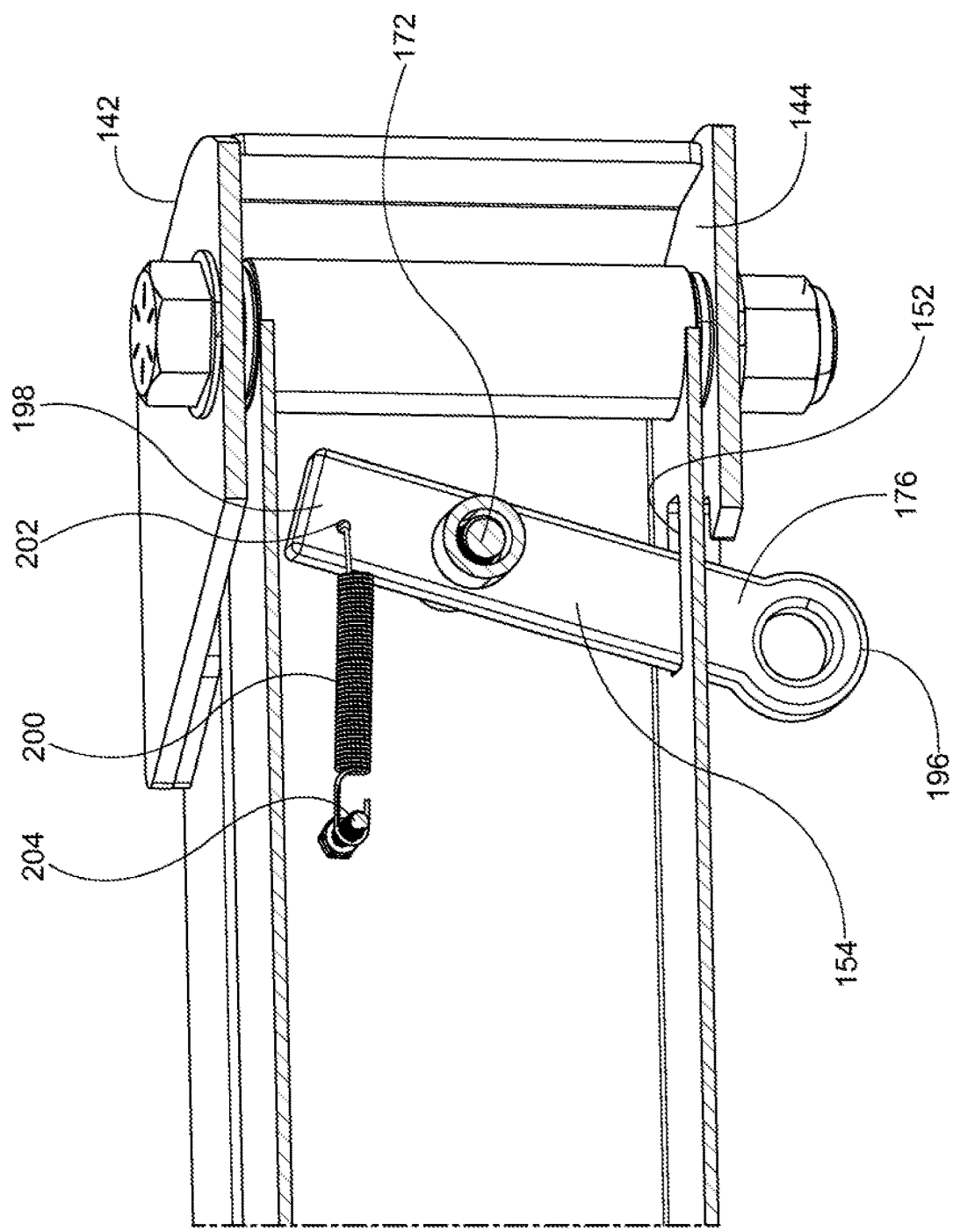
FIG. 18B is a cross-sectional view of a portion of an additional embodiment of the inventive device in an unlatched configuration.

In the embodiment shown in FIGS. 18A and 18B, the biasing mechanism is an extension spring 200 attached between the latch bar 154 and the support member 106. The spring 200 may be attached either forward or backward of the latch bar 154 so long as when it is attached to the latch bar 154 the spring 200 applies a force to the latch bar 154 that biases it toward the latched configuration. In embodiments having a latch bar that moves pivotally with respect to support member 106, the end of spring 200 is preferably attached to the latch bar at a point that is spaced apart from the pivot axis of the latch bar at pin 172 to have sufficient leverage to apply the desired biasing force to the latch bar 154.

In the depicted embodiment, the spring 200 is attached to the upper end 198 of latch bar 154. The spring 200 is shown with one end thereof inserted into a hole 202, but in some embodiments the end of the spring 200 may be attached to a screw, post, or pin that is attached to the latch bar 154, wrapped around the latch bar 154 or some feature thereof, or other similar means of attachment. In the depicted embodiment, the other end of the spring 200 is attached to a support post 204 that is attached to support member 106. In other embodiments, the other end of spring 200 may be attached directly to the support member 106 or to another structural component of the device. In this embodiment, the spring 200 applies a biasing force to the latch bar 154 sufficient to hold it in the latched position as shown in FIG. 18A. When the latch bar in that embodiment pivots to the unlatched position shown in FIG. 18B the spring 200 is extended and thus exerts an additional force on the latch bar 154 that biases or urges the latch bar 154 to return to the latched configuration as soon as the lug 176 of the latch bar 154 is aligned with a slot or aperture 148.

In some embodiments the latch bar 154 may not be pivotally attached to the support member 106 and may move linearly, instead of pivotally, between the latched and unlatched configurations. In FIGS. 19A and 19B, one such embodiment is depicted in the latched and unlatched configurations, respectively. In this embodiment the latch bar 154 is attached to the support member 106 by two support posts 206 that are disposed through slots 208 in the latch bar 154. The latch bar 154 may translate back and forth on the posts 206 to the extent of the length of the slots 208. The depicted embodiment is actuated using the connecting rod 158 and bracket 164 similar to other described embodiments. No biasing mechanism is depicted in FIGS. 19A and 19B though it may be provided attached to the connecting member 158 or to an actuator 114. In the depicted embodiment the latch bar 154 has two lug portions 176 and extends through apertures 152 in both the top and bottom surface of support member 106. Further, in this embodiment both the top member 142 and bottom member 144 of the pivotal attachment 108 are provided with apertures 148 for receiving and securing the latch bar 154 in the latched configuration.

In some embodiments the actuator 114 may be the end of the connecting member 158 or a simple attachment to that connecting member 158. For example, the embodiment shown in FIG. 20A has the end 192 of connecting member 158 extending out through aperture or slot 163 so that a user may move it linearly back and forth to actuate any of the embodiments of the latch bar 154. In varying embodiments, the actuator may be disposed at one or more different locations on the assembly. Multiple actuators may be provided at different locations so users may actuate the release function from a variety of different locations around the device. The slot for the actuator may be wider for all or a portion of the slot such as portion 210, to allow a protrusion or other feature on an actuator to extend into or through the slot 210.

Figure 20C:
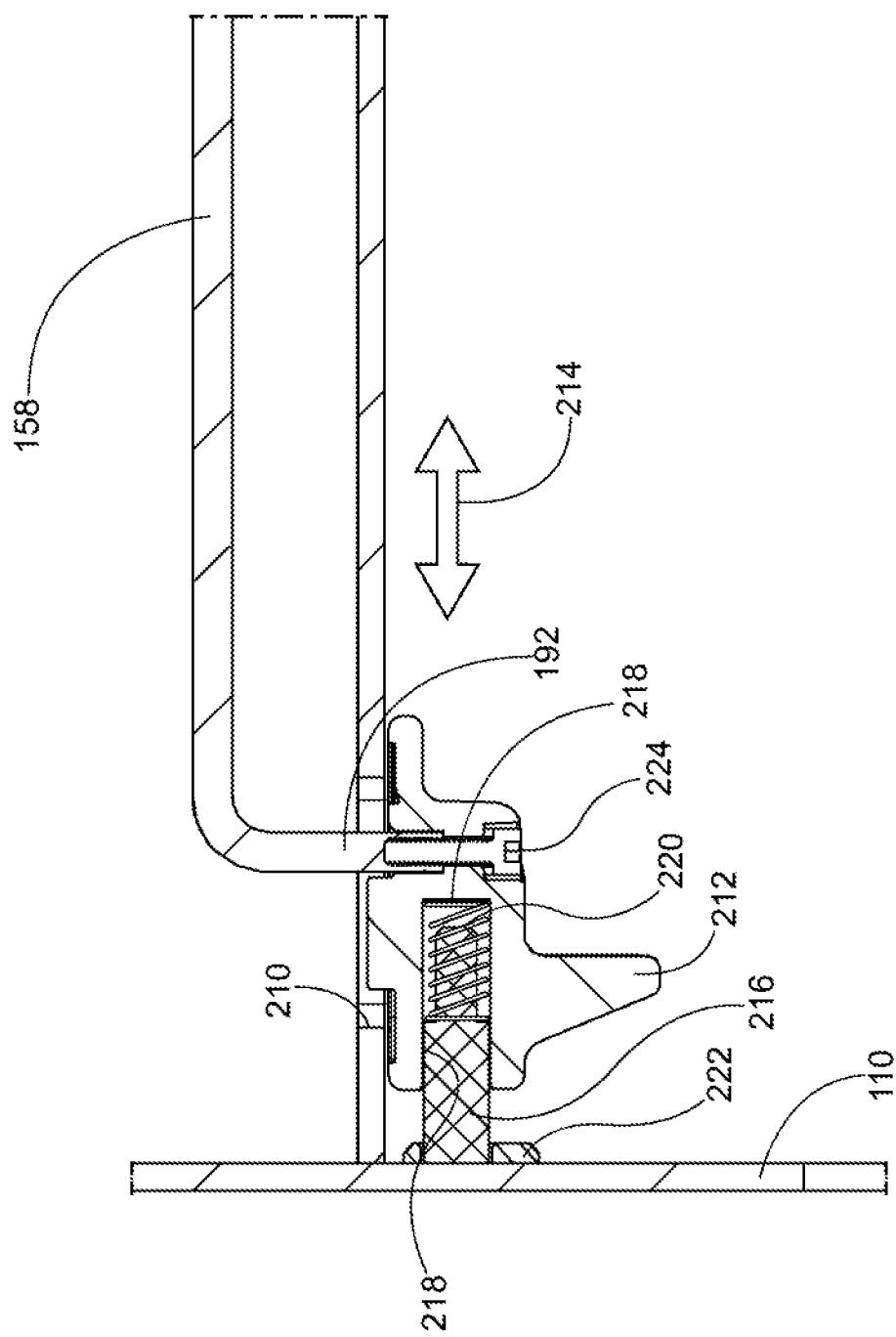
FIG. 20C is a cross-sectional view of a portion of an additional embodiment of the inventive device in a latched configuration.

FIG. 20B depicts an embodiment with an actuator 212 attached to the end 192 of a connecting member 158. This embodiment of actuator 212 has a protrusion that fits into slot 210 to allow the actuator 212 to slide linearly back and forth in the directions indicated by arrow 214. FIG. 20C depicts an embodiment with an actuator 212 as shown in FIG. 20B. FIG. 20C is a top-down cross-sectional view through the actuator 212 and connecting rod 158. The actuator 212 is attached to the end 192 of connecting rod 158 by screw 224. The protrusion on the inside surface of the actuator 212 extends into slot 210. In some embodiments a retention member may be attached to the actuator 212 inside the cavity of the support member 106 to hold the actuator 212 in the desired position. In some embodiments, the actuator 212 may be considered attached to the support member even if it is held onto the support member only by its attachment to the connecting rod 158.

The actuator 212 depicted in FIG. 20C also has a biasing mechanism attached to the actuator 212. In this embodiment, the body of the actuator 212 is provided with a socket 218 for receiving a compression post or rod 216. On a first end the post 216 has a shoulder and narrower end segment for receiving a compression spring 220. The second end of the post 216 butts against another part of the structure of the device, such as receiver socket 110. A bracket or retaining ring 222 may be attached to either the post 216, the structure 110, or both, to hold the second end of the post 216 in place. The compression spring exerts a force against the actuator 212 and the structure 110 in opposite directions, and since the structural element 110 is fixedly attached to support member 106, the actuator 212 will move in response to the force as much as possible. The compression spring 220 pushes the actuator 212 away from the structural element 110, thus pushing the connecting member 158 and thereby applying a force to the latch bar 154 to urge it toward the latched position. In a preferred embodiment, when the assembly is in the latched configuration the spring 220 will be compressed sufficient to exert some force on the actuator 212 to resist it leaving the latched position. As a user moves the actuator 212 toward the member 110, it further compresses spring 220 between the end of socket 218 and the shoulder on post 216, thus increasing the force exerted by the spring 220.

Changes may be made in the above methods, devices and structures without departing from the scope hereof. Many different arrangements of the various components depicted, as well as components not shown, are possible without departing from the spirit and scope of the present invention. Embodiments of the present invention have been described with the intent to be illustrative and exemplary of the invention, rather than restrictive or limiting of the scope thereof. Alternative embodiments will become apparent to those skilled in the art that do not depart from its scope. Specific structural and functional details disclosed herein are not to be interpreted as limiting, but merely as a representative basis for teaching one of skill in the art to employ the present invention in any appropriately detailed structure. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

"Substantially", "approximately", or "about" means to be more-or-less conforming to the particular dimension, range, shape, concept, or other aspect modified by the term, such that a feature or component need not conform exactly. For example, a "substantially cylindrical" object means that the object resembles a cylinder but may have one or more deviations from a true cylinder, two objects are "substantially parallel" if an axis of one of the objects partially extends in a direction that is 10 degrees or less from a portion of an axis of the other object, and a first object is "substantially inside" a second object if 50% or more of the first object is within the external volume of the second object.

A first component of a device is "adjacent to" or "in proximity to" a second component of the device if the distance between the first component and the second component is 25% or less of the largest dimension of the device in the stated configuration. As an example, the largest dimension of the device depicted in FIG. 4 extends along the lengthwise axis of the support members 106 and 104 from the tip of pivotal attachment 108 to the far side of drawbar 102.

"Comprising," "including," and "having" (and conjugations thereof) are used interchangeably to mean including but not necessarily limited to, and are open-ended terms not intended to exclude additional, unrecited elements or method steps.

The invention claimed is:

1. A pivoting hitch device for a vehicle with a receiver hitch, the pivoting hitch device comprising:
    a first support member attached to a receiver drawbar, the first support member extending from the receiver drawbar toward a side of the vehicle;
    a second support member pivotally attached by a hinge to the first support member near the side of the vehicle and extending therefrom toward the receiver drawbar, and parallel to the first support member in a closed position, the second support member pivotable from the closed position to an open position that is non-parallel to the first support member;
    a receiver socket attached to the second support member in proximity to the receiver drawbar when the second support member is in the closed position;
    a latch actuator attached to the second support member in proximity to the receiver socket;
    a latch bar attached to the second support member in proximity to the hinge;
    a latch member attached to the first support member in proximity to the hinge, wherein the latch bar engages the latch member in a latched position; and
    a biasing mechanism that biases the latch bar toward the latched position.

2. The pivoting hitch device of claim 1 wherein the latch bar comprises a lug portion, and the latch bar body extends through an aperture in the second support member with at least a portion of the lug portion disposed outside the second support member.

3. The pivoting hitch device of claim 2 wherein the latch member comprises a plate extending from the first support member adjacent to the aperture in the second support member.

4. The pivoting hitch device of claim 3 wherein the latch member further comprises at least one latching feature for engaging the lug portion of the latch bar disposed outside the second support member.

5. The pivoting hitch device of claim 4 wherein the at least one latching feature comprises a notch in an edge of the plate, wherein moving the latch bar from the latched position to the unlatched position disengages the lug portion of the latch bar from the notch.

6. The pivoting hitch device of claim 4 wherein when the latch bar is not in the latched position, the lug portion of the latch bar does not engage the notch in the plate and the second support member may move pivotally with respect to the first support member.

* * * * *